United States Patent
Ode

(10) Patent No.: US 9,401,797 B2
(45) Date of Patent: *Jul. 26, 2016

(54) RADIO COMMUNICATION SYSTEM, COMMUNICATION CONTROLLER, AND BASE STATION

(71) Applicant: FUJITSU LIMITED, Kawasaki-shi, Kanagawa (JP)

(72) Inventor: Takayoshi Ode, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,908

(22) Filed: Jun. 17, 2015

(65) Prior Publication Data
US 2015/0288488 A1  Oct. 8, 2015

Related U.S. Application Data

(63) Continuation of application No. 13/861,813, filed on Apr. 12, 2013, now Pat. No. 9,094,939, which is a continuation of application No. PCT/JP2010/069885, filed on Nov. 9, 2010.

(51) Int. Cl.
*H04B 7/00* (2006.01)
*H04L 5/00* (2006.01)
(Continued)

(52) U.S. Cl.
CPC ............... *H04L 5/006* (2013.01); *H04L 5/001* (2013.01); *H04L 5/0007* (2013.01);
(Continued)

(58) Field of Classification Search
CPC ........ H04B 7/00; H04W 72/00; H04W 16/14; H04W 72/04; H04L 5/00

USPC ........... 370/310, 328, 329, 343; 455/422, 450
See application file for complete search history.

(56) References Cited

U.S. PATENT DOCUMENTS 8,570,928 B2 * 10/2013 Wu .................... H04W 72/005
                                                              370/312
2007/0263576 A1  11/2007 Deguchi
(Continued)

FOREIGN PATENT DOCUMENTS

EP          1 732 338           12/2006
EP          2413617              2/2012
(Continued)

OTHER PUBLICATIONS

International Search Report issued for corresponding International Patent Application No. PCT/JP2010/069885, mailed Dec. 7, 2010 with English translation.
(Continued)

*Primary Examiner* — Dmitry H Levitan
(74) *Attorney, Agent, or Firm* — Myers Wolin, LLC

(57) ABSTRACT

Each of two or more base stations notifies a communication controller of information on a first frequency band that the base station uses for radio communication. Based on the information on the first frequency bands acquired from the two or more base stations, the communication controller selects a second frequency band to be used by the two or more base stations to transmit the data with common content, and notifies the two or more base stations of information on the selected second frequency band. The two or more base stations transmit the data with common content based on the information on the second frequency band acquired from the communication controller.

2 Claims, 24 Drawing Sheets

(51) Int. Cl.
*H04W 16/14* (2009.01)
*H04W 72/00* (2009.01)
*H04W 72/04* (2009.01)
*H04W 72/02* (2009.01)

(52) U.S. Cl.
CPC ............ *H04L 5/0096* (2013.01); *H04W 16/14* (2013.01); *H04W 72/005* (2013.01); *H04W 72/02* (2013.01); *H04W 72/0433* (2013.01); *H04L 5/0087* (2013.01)

(56) References Cited

U.S. PATENT DOCUMENTS

2008/0045224 A1* 2/2008 Lu ..................... H04W 72/005 455/446
2012/0002584 A1 1/2012 Shimizu

FOREIGN PATENT DOCUMENTS

| JP | 2007-189619 | 7/2007 |
|---|---|---|
| JP | 2008-211696 | 9/2008 |
| JP | 2009-182944 | 8/2009 |
| JP | 2009-246526 | 10/2009 |
| WO | 2008/023613 | 2/2008 |
| WO | 2010/073895 | 7/2010 |
| WO | 2010/109547 | 9/2010 |

OTHER PUBLICATIONS

Non-Final Office Action issued by the United States Patent and Trademark Office for corresponding U.S. Appl. No. 13/861,813, issued Nov. 13, 2014.

Taiwanese Office Action issued for corresponding Taiwanese Patent Application No. 99138479 issued Dec. 11, 2014 with an English translation.

Extended European search report issued for corresponding European Patent Application No. 10859513.3, dated May 20, 2014.

Jotten et al. "Performance Evaluation of Multicast/Broadcast Single Frequency Network Operation for WCDMA", Aug. 25-28, 2008, pp. 85-90, 2008 IEEE 10th International Symposium on Spread Spectrum Techniques and Applications (ISSSTA 2008), IEEE, Bologna, Italy.

\* cited by examiner

RADIO COMMUNICATION SYSTEM, COMMUNICATION CONTROLLER, AND BASE STATION

CROSS-REFERENCE TO RELATED APPLICATION

This application is a continuation of U.S. application Ser. No. 13/861,813, filed on Apr. 12, 2013, now pending, which is a continuation of International Application PCT/JP2010/069885 filed on Nov. 9, 2010 which designated the U.S., the entire contents of each are wholly incorporated herein by reference.

FIELD

The embodiments discussed herein are related to a radio communication system, a communication controller, and a base station.

BACKGROUND

Currently, radio communication systems such as mobile phone systems and wireless LAN (Local Area Networks) are widely in use. In addition, active discussions on next generation radio communication technology have been continued in order to further increase the speed and capacity of radio communication. For example, the 3GPP (3rd Generation Partnership Project), which is an international standards organization, has proposed a communication standard called LTE (Long Term Evolution) which allows data communication using a frequency band up to 20 MHz. Further, a communication standard called LTE-A (Long Term Evolution-Advanced) which allows data communication using up to five 20-MHz carriers (that is, 100 MHz) has been proposed as a next generation communication standard after the LTE standard.

In LTE and LTE-A, a data transmission scheme called MBSFN (Multimedia Broadcast multicast service Single Frequency Network) has been examined. In a radio communication system providing MBSFN transmission, one or more MBSFN areas each including multiple base stations are formed. The multiple base stations belonging to the same MBSFN area concurrently transmit data with the same content using the same frequency and the same modulation scheme. Data transmitted using MBSFN is sometimes referred to as the MBMS (Multimedia Broadcast Multicast Service) data. A mobile station combines MBMS data signals transmitted from multiple base stations, and demodulates and decodes the combined signal, which leads to an improvement in reception quality of the MBMS data.

As for LTE, a proposed technique is directed to a base station operating multiple cells, which acquires capability information from a mobile station in the case where frequency bands for data transmission and reception are different for different mobile stations, and determines a target cell of the mobile station based on the capability information (see, for example, International Publication Pamphlet No. WO 2008/023613). As for MBSFN, a technique has been proposed in which a serving cell selected from among cells in an MBSFN area and allocating radio resources to a mobile station notifies the mobile station of a frequency at which MBMS services are provided (see, for example, Japanese Laid-open Patent Publication No. 2009-182944). Another proposed MBSFN technique is directed to a control apparatus called MCE (Multi-cell/multicast Coordination Entity) which collects, via base stations, reports on quality of MBMS services evaluated by mobile stations and allocates radio resources based on the collected reports (see, for example, Japanese Laid-open Patent Publication No. 2009-246526).

In a radio communication system where multiple base stations may transmit data with the same content at the same frequency, a communication controller such as an MCE may select a frequency band used for transmitting the data with the same content and instruct the base stations to use the frequency band. On the other hand, the base stations may employ different frequency bandwidths, such as 10 MHz, 15 MHz, and 20 MHz, for their radio communication. Further, the base stations may operate at different center frequencies with the various frequency bands.

As a result, what remains an issue is how the communication controller selects the above-described frequency band used for transmitting the data with the same content. Assume, for example, that the communication controller selects a frequency band of 15 MHz for the transmission while there is a base station using a frequency band of only 10 MHz in the radio communication system. In this case, due to lack of radio resources, the base station is not able to transmit data for up to 5 MHz of the data with the same content. This may result in a decrease in reception quality at a radio receiver with respect to the data with the same content transmitted from two or more base stations.

SUMMARY

According to an aspect of the embodiments to be discussed herein, there is provided a radio communication system. This radio communication system includes a communication control apparatus; a plurality of base stations; and a radio receiving apparatus, in which radio communication system, two or more base stations among the plurality of base stations transmit data with common content to the radio receiving apparatus at a frequency common to the two or more base stations, wherein each of the two or more base stations includes a first control unit for notifying the communication control apparatus of information on a first frequency band that the base station uses for radio communication, and controlling transmission of the data with common content based on information on a second frequency band notified of by the communication control apparatus, and the communication control apparatus includes a second control unit for selecting the second frequency band used to transmit the data with common content based on the information on the first frequency bands notified of by the two or more base stations, and a notifying unit for notifying the two or more base stations of the information on the selected second frequency band.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Several embodiments will be described below with reference to the accompanying drawings.

First Embodiment

Figure 1:
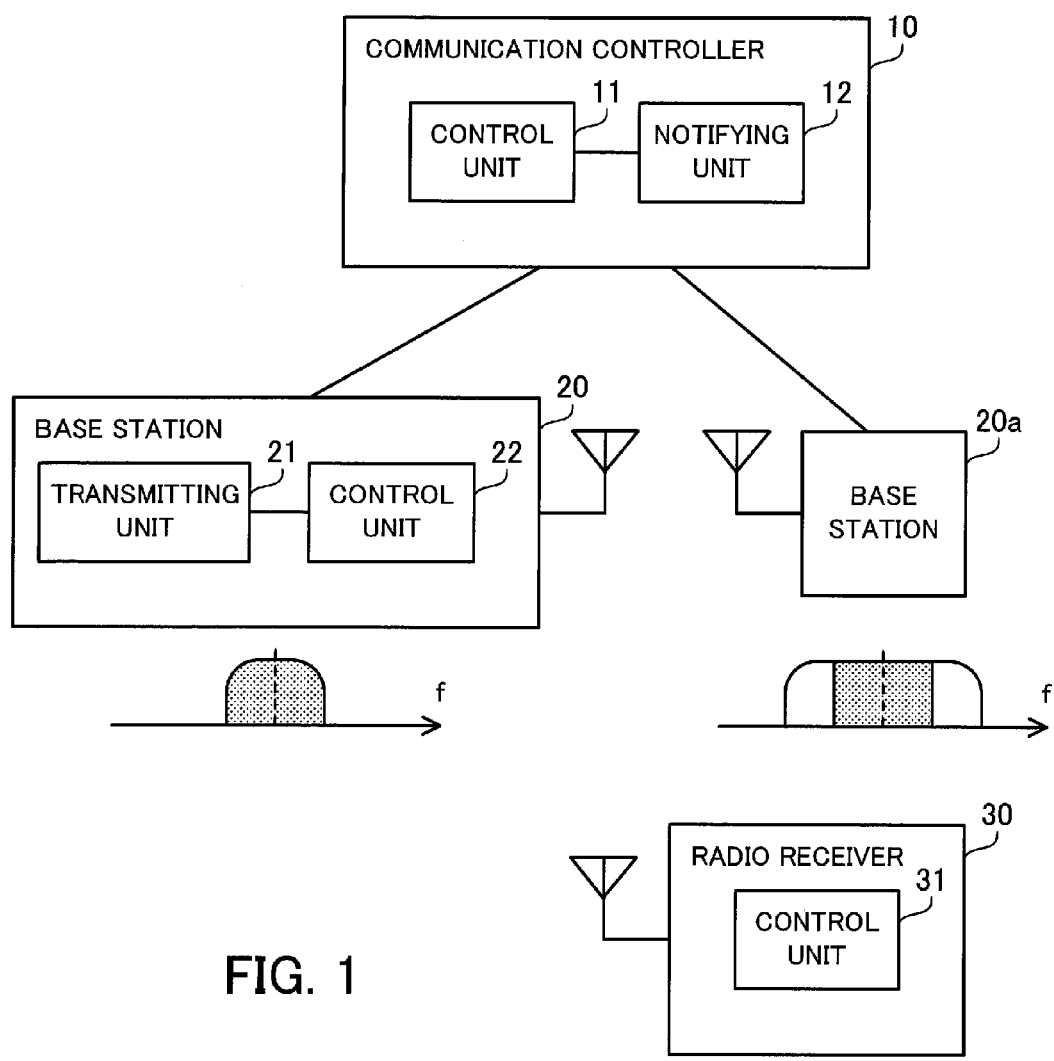
FIG. 1 illustrates a radio communication system according to a first embodiment.

FIG. 1 illustrates a radio communication system according to a first embodiment. The radio communication system of the first embodiment includes a communication controller 10, multiple base stations including base stations 20 and 20a, and a radio receiver 30. The communication controller 10 is, for example, an MCE. The communication controller 10 may be a device independent of the multiple base stations, or may be installed in at least one of the multiple base stations. The base stations 20 and 20a transmit data with common content (for example, data with the same, or partially the same, content) to the radio receiver 30 at a frequency common to both the base stations 20 and 20a (for example, the same frequency). For example, the base stations 20 and 20a carry out MBSFN transmission. Note that the radio receiver 30 may be a mobile or fixed radio communication device.

The communication controller 10 includes a control unit 11 and a notifying unit 12. The control unit 11 may acquire, from each of the base stations 20 and 20a, information on a frequency band that the base station 20/20a uses for radio communication with the radio receiver 30 (first frequency band). The first frequency band of the base station 20 may be different from that of the base station 20a. Based on the acquired information on the first frequency bands, the control unit 11 may select a frequency band to be used by the base stations 20 and 20a to transmit data with common content (second frequency band). The notifying unit 12 may notify the base stations 20 and 20a of information on the second frequency band selected by the control unit 11.

The base station 20 includes a transmitting unit 21 and a control unit 22. Similarly to the base station 20, the base station 20a also includes a transmitting unit and a control unit. Under the control of the communication controller 10, the transmitting unit 21 may transmit data with content common to data transmitted by the base station 20a at a frequency in common with the base station 20a. The control unit 22 may notify the communication controller 10 of the information on the first frequency band of the base station 20, and acquire information on the second frequency band from the communication controller 10. The control unit 22 controls data transmission of the transmitting unit 21 based on the acquired information on the second frequency band. For example, the control unit 22 may map a data signal to the second frequency band. The control unit 22 may notify the radio receiver 30 of the information on the second frequency band.

The radio receiver 30 combines data signals transmitted by the base stations 20 and 20a and extracts data from the combined data signal. The radio receiver 30 includes a control unit 31. When notified of the information on the second frequency band by the base station 20 (or 20a), the control unit 31 may control reception of data transmitted by the base stations 20 and 20a in a coordinated manner, based on the information on the second frequency band. For example, the control unit 31 may control the data reception to extract the data signal in the notified second frequency band.

The multiple base stations are capable of individually operating at substantially the same center frequency (alternatively, substantially the same maximum or minimum frequency) of their corresponding first frequency bands. The bandwidths of the first frequency bands employed by the individual base stations may be different from one another. In that case, each of the base stations 20 and 20a may notify the communication controller 10 of information on the first frequency band, for example, information indicating a bandwidth of the first frequency band. The communication controller 10 notifies the base stations 20 and 20a of information on the second frequency band, for example, information indicating a bandwidth of the second frequency band.

Alternatively, the multiple base stations may operate at mutually different center frequencies of their first frequency bands. In that case, the information on the first frequency band notified of by each of the base stations 20 and 20a may indicate the center frequency and the bandwidth of the first frequency band. The information on the second frequency band notified of by the communication controller 10 may indicate the center frequency and the bandwidth of the second frequency band. Note however that the way to designate the first and second frequency bands is not limited to the above-described method. For example, a frequency band likely to be used by the multiple base stations may be divided into multiple sub-ranges, to each of which an identification symbol is assigned, so that the designation of the individual first and second frequency bands is made using an identification symbol corresponding to a sub-range to be used.

The second frequency band may be selected, for example, from a frequency range included in both the first frequency bands of the base stations 20 and 20a (i.e., a frequency range commonly used by the base stations 20 and 20a). The control unit 11 may select the whole of the common frequency range as the second frequency band. Alternatively, determining the common frequency range as an available frequency band, the control unit 11 may select a part or the entire available frequency band in response to the status of the data transmission. Note that if there is no frequency range commonly used by all of two or more base stations for transmitting data with common content, a frequency range commonly used by the most base stations may be selected as the second frequency band.

The information on the first frequency band may be sent from each of the base stations 20 and 20a to the communication controller 10, for example, when the base stations 20 and 20a individually start their operation. In addition, if a change is made to the first frequency band of the base station 20/20a, the corresponding base station 20/20a notifies the communication controller 10 of information on the changed first frequency band. Upon acquiring the information on the changed first frequency band, the control unit 11 may recalculate the second frequency band (or the frequency band available as the second frequency band). In addition, the control unit 11 may carry out the recalculation when there is a change to the group of multiple base stations for transmitting data with common content.

Assume, for example, that the base stations 20 and 20a for transmitting data with common content operate in the first frequency bands of 10 MHz and 20 MHz, respectively, but that the first frequency bands of the base stations 20 and 20a have the same center frequency. The control unit 11 may select 10 MHz, which is the smaller one of the bandwidths of the base stations 20 and 20a, as the bandwidth of the second frequency band used to transmit the data with common content. This facilitates both the base stations 20 and 20a to reserve radio resources of 10 MHz used to transmit the data with common content. Note that when there is a change to the first frequency band of the base station 20 or when the base station 20 stops transmitting the data with common content, the control unit 11 may recalculate the bandwidth of the second frequency band.

According to the radio communication system of the first embodiment, each of the base stations 20 and 20a notifies the communication controller 10 of information on the first frequency band that the base station 20/20a uses for radio communication. Based on the information on the first frequency bands notified of by the individual base stations 20 and 20a, the communication controller 10 selects the second frequency band to be used by the base stations 20 and 20a to transmit data with common content. Subsequently, the communication controller 10 notifies the base stations 20 and 20a of information on the selected second frequency band. Based on the notified information on the second frequency band, the base stations 20 and 20a transmit the data with common content.

This allows the communication controller 10 to recognize setting statuses of the first frequency bands of the base stations 20 and 20a and, therefore, the communication controller 10 is able to designate an appropriate second frequency band for the base stations 20 and 20a. The appropriate designation of the second frequency band reduces the possibility that the individual base stations 20 and 20a will be incapable of transmitting part of data due to lack of radio resources therein. As a result, it is possible to reduce loss of data reception quality at the radio receiver 30. In addition, as compared to the case of selecting the second frequency band on the basis of using the smallest possible bandwidth for the first frequency bands, the first embodiment prevents the bandwidth of the second frequency band from becoming excessively small and, thus, ensures the efficient use of radio resources of the base stations 20 and 20a. Further, the communication controller 10 is able to provide a dynamic response to a change made to the first frequency band of the base station 20/20a.

Note that the radio communication system of the first embodiment may be implemented as an LTE or LTE-A system. Second and third embodiments described below are directed to examples of an LTE or LTE-A mobile communication system.

Second Embodiment

Figure 2:
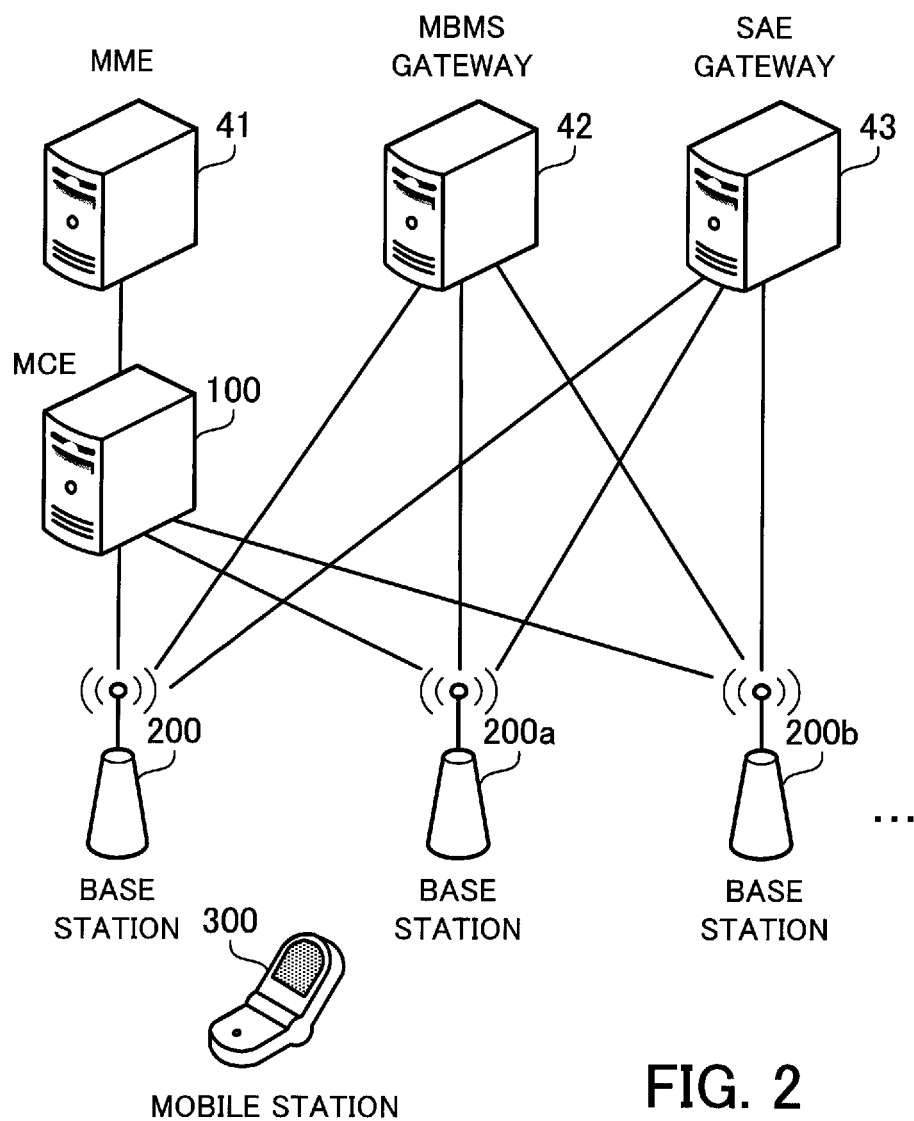
FIG. 2 illustrates a mobile communication system according to a second embodiment.

FIG. 2 illustrates a mobile communication system according to the second embodiment. The mobile communication system of the second embodiment includes an MCE 100; multiple base stations including base stations 200, 200a, and 200b; a mobile station 300; an MME (Mobility Management Entity) 41; an MBMS gateway 42; and a SAE (System Architecture Evolution) gateway 43. The MCE 100 and the mobile station 300 are examples of the communication controller 10 and the radio receiver 30, respectively, described above.

The MCE 100 is a communication controller for controlling MBSFN transmission. The MCE 100 receives, from each of the base stations 200, 200a, and 200b, a band notification indicating a frequency band used by (or available for) the base station for radio communication, and determines a frequency band available for transmission of MBMS data. The MCE 100 also receives an MBSFN request indicating a desired MBMS service from the mobile station 300 via the base station 200, and schedules transmission of MBMS data. Subsequently, the MCE 100 transmits, to the base stations 200, 200a, and 200b and the MBMS gateway 42, MBSFN control information indicating radio resources and a Modulation and Coding Scheme (MCS) to be used for the transmission of MBMS data.

The base stations 200, 200a, and 200b are radio communication devices for individually communicating via radio waves with the mobile station 300. Each of the base stations 200, 200a, and 200b is connected to the MCE 100, the MME 41, the MBMS gateway 42, and the SAE gateway 43 via a wired network. Each of the base stations 200, 200a, and 200b is configured to transfer dedicated data of the mobile station 300 between the mobile station 300 and the SAE gateway 43. In addition, under the control of the MCE 100, all the base stations 200, 200a, and 200b carry out MBSFN transmission, in which MBMS data acquired from the MBMS gateway 42 is transmitted.

Note that the base stations 200, 200a, and 200b may use different frequency bands for the radio communication with the mobile station 300. The bandwidth of each of the frequency bands is selected, for example, from 1.4 MHz, 3 MHz, 5 MHz, 10 MHz, 15 MHz, and 20 MHz. In addition, the frequency bands used by the base stations 200, 200a, and 200b may be dynamically changed during the operation. For example, each of the base stations 200, 200a, and 200b is configurable to operate in a frequency band with a wider bandwidth during high traffic hours while operating in a frequency band with a narrower bandwidth during low traffic hours.

The mobile station 300 is a radio terminal, such as a mobile telephone or a mobile information terminal, and communicates via radio waves with the base stations 200, 200a, and 200b. The second embodiment is directed to a case in which the mobile station 300 is connected to the base station 200. The mobile station 300 transmits dedicated data to the base station 200 in the uplink (UL), and receives dedicated data from the base station 200 in the downlink (DL). In addition, the mobile station 300 receives MBMS data transmitted in the downlink by MBSFN. The mobile station 300 combines MBMS data signals concurrently transmitted by multiple base stations, including the base stations 200, 200a, and 200b, at the same frequency, and demodulates and decodes the combined signal to extract the MBMS data.

The MME 41 is a communication controller for managing the mobility of the mobile station 300. The MME 41 communicates with the base stations 200, 200a, and 200b to manage a serving cell of the mobile station 300. The MBMS gateway 42 is a communication device for processing MBMS data to be transmitted by MBSFN. Based on MBSFN control information received from the MCE 100, the MBMS gateway 42 transmits MBMS data to the base stations 200, 200a, and 200b. The SAE gateway 43 is a communication device for processing dedicated data of the mobile station 300. The SAE gateway 43 transmits dedicated data directed to the mobile station 300 to the base station 200, and receives dedicated data transmitted by the mobile station 300 from the base station 200.

Note that MBSFN operation is controlled by the stand-alone MCE 100 according to the second embodiment. However, the function of the MCE 100 may be implemented on at least one of the base stations 200, 200a, and 200b. For example, a control device corresponding to the MCE 100 may be installed in the base station 200, which communicates with the base stations 200a and 200b to control MBSFN operation. Alternatively, the function of the MCE 100 may be implemented on a different communication controller in the wired network, such as the MME 41.

Figure 3:
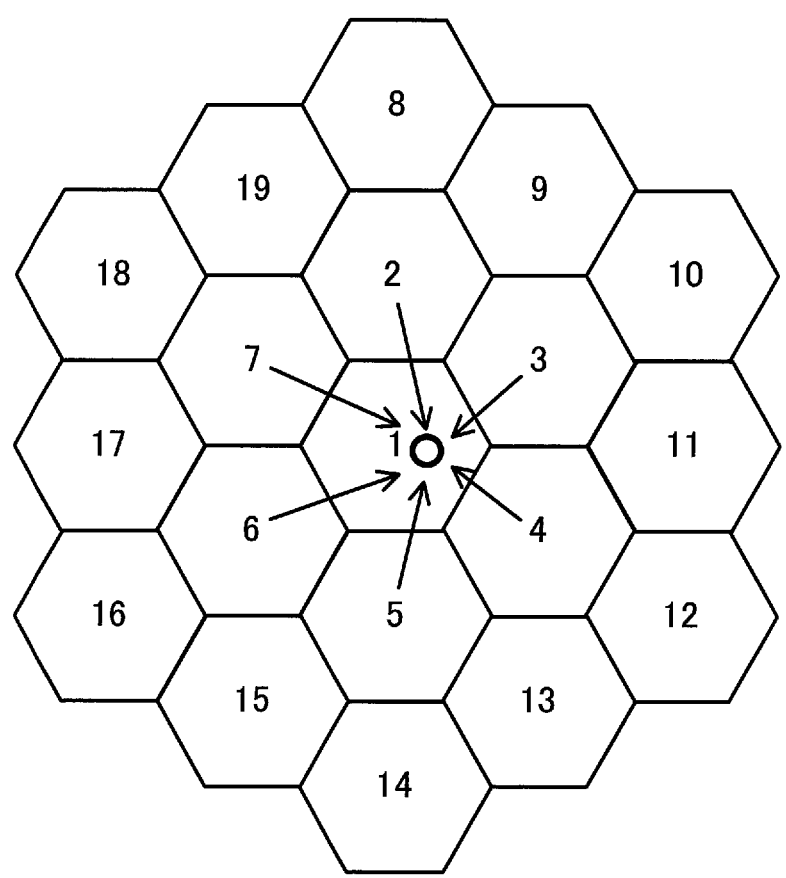
FIG. 3 illustrates a configuration example of an MBSFN area.

FIG. 3 illustrates a configuration example of an MBSFN area. Within the MBSFN area, MBMS data transmission is synchronized by the control of the MCE 100. The MBSFN area includes 19 cells (cells #1 to #19) according the example of FIG. 3.

Assume here that the mobile station 300 exists in cell #1, and that MBMS data to be received by the mobile station 300 is transmitted in the cells #1 to #19 included in the single MBSFN area. In this case, the mobile station 300 combines MBMS data signals of up to 19 cells, and demodulates and decodes the combined signal, to thereby extract the MBMS data. Note however that it is possible to prevent the MBMS data to be received by the mobile station 300 from being transmitted in some cells of the MBSFN area. In addition, a single cell may belong to multiple MBSFN areas.

Figure 4:
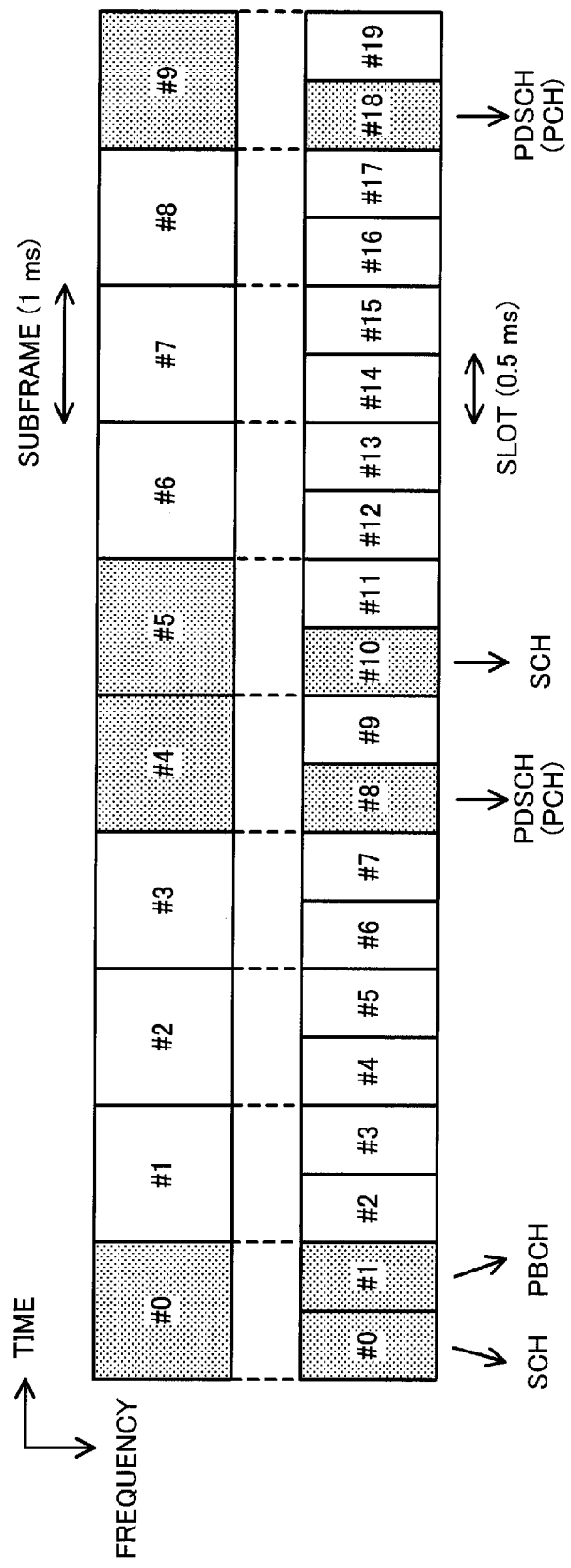
FIG. 4 illustrates a structural example of a radio frame.

FIG. 4 illustrates a structural example of a radio frame. The radio frame as illustrated in FIG. 4 is transmitted between the base stations 200, 200a, and 200b and the mobile station 300. Note however that the structure of FIG. 4 is merely an example, and the structure of the radio frame is not limited to this example. According to the example, the radio frame with a duration of 10 ms includes 10 subframes (subframes #0 to #9) each having a duration of 1 ms. Each subframe includes two slots, each with a duration of 0.5 ms. That is, the 10-ms radio frame includes 20 slots (slots #0 to #19).

For management purposes, radio resources in the radio frame are subdivided in the time and frequency directions. As a multiplexing access scheme, for example, OFDMA (Orthogonal Frequency Division Multiple Access) is used for the downlink, and SC-FDMA (Single-Carrier Frequency Division Multiple Access) or NxDFT-s-OFDM (N x Discrete Fourier Transform spread Orthogonal Frequency Division Multiple Access) is used for the uplink. Each slot includes 7 or 6 symbols in the time direction. In each symbol, a guard interval called cyclic prefix (CP) is inserted. In the frequency direction, the radio frame includes multiple resource blocks (RB), each of which includes multiple subcarriers. Radio resources defined in the time-frequency domain are assigned to each channel.

In a downlink radio frame, a Synchronization Channel (SCH) for transmitting a synchronization signal is assigned to slots #0 and #10. A Physical Broadcast Channel (PBCH) for transmitting broadcast information is assigned to slot #1. In slots #8 and #18, a Paging Channel (PCH), which is a transport channel used for paging the mobile station 300, is mapped to a Physical Downlink Shared Channel (PDSCH).

Note that a subframe for transmitting MBMS data (MBSFN subframe) is selected from subframes #1 to #3 and #6 to #8, to which none of the SCH, PBCH, and PCH is assigned.

Figure 5:
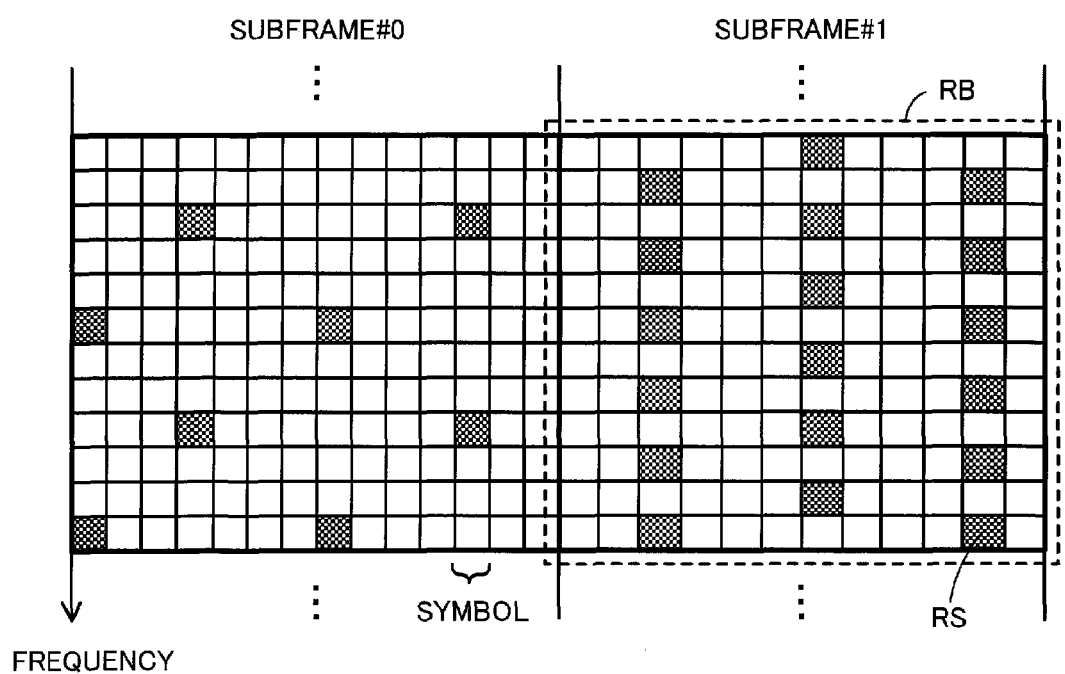
FIG. 5 illustrates a structural example of a subframe.

FIG. 5 illustrates a structural example of a subframe. In the example of FIG. 5, subframe #0 is a normal subframe, and subframe #1 is an MBSFN subframe. The normal subframe includes 7×2 symbols with normal cyclic prefixes inserted thereinto while the MBSFN subframe includes 6×2 symbols with extended cyclic prefixes inserted thereinto. In each subframe, plot signals called reference signals (RS) are transmitted. The reference signals are used to measure reception quality at the mobile station 300. The reference signals in the normal subframe have a different signal sequence from that of the reference signals in the MBSFN subframe.

Although FIG. 5 depicts only one resource block in the frequency direction to facilitate easy understanding, the radio frame actually includes multiple resource blocks in the frequency direction. For example, in a frequency band of 1.4 MHz, 6 resource blocks are included; in a frequency band of 3 MHz, 15 resource blocks are included; in a frequency band of 5 MHz, 25 resource blocks are included; in a frequency band of 10 MHz, 50 resource blocks are included; in a frequency band of 15 MHz, 75 resource blocks are included; and in a frequency band of 20 MHz, 100 resource blocks are included.

Figure 6:
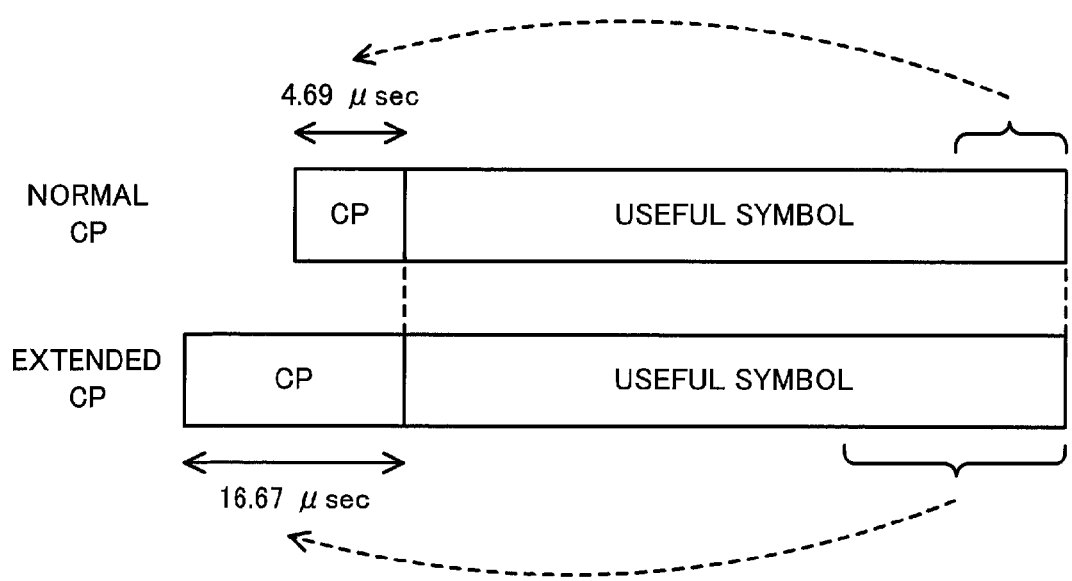
FIG. 6 illustrates a structural example of a symbol.

FIG. 6 illustrates a structural example of a symbol. The symbol includes a useful symbol which is a data portion and a cyclic prefix which is a guard interval. The cyclic prefix is a duplication of the last portion of the useful symbol, and is prefixed to the beginning of the useful symbol. As described above, there are two types of cyclic prefixes of different lengths, a normal cyclic prefix and an extended cyclic prefix. The duration of the normal cyclic prefix is 4.69 μsec while the duration of the extended cyclic prefix is 16.67 μsec, for example. The duration of the useful symbol stays the same regardless of using the normal prefix or the extended cyclic prefix.

For a normal subframe, the normal cyclic prefixes are generally used while the extended cyclic prefixes are used for an MBSFN subframe. The mobile station 300 is configured to combine a delay wave signal having a delay time equal to or less than the cyclic prefix length with a direct wave signal and other delay wave signals, and demodulate the combined signal. Compared to symbols with the normal cyclic prefixes, symbols with the extended cyclic prefixes allow the mobile station 300 in the process of extracting MBMS data to use radio signals with larger delay time (for example, radio signals transmitted from distant base stations) for the signal combination and demodulation. This leads to an improvement in reception quality of MBMS data transmitted in the MBSFN subframe.

Figure 7:
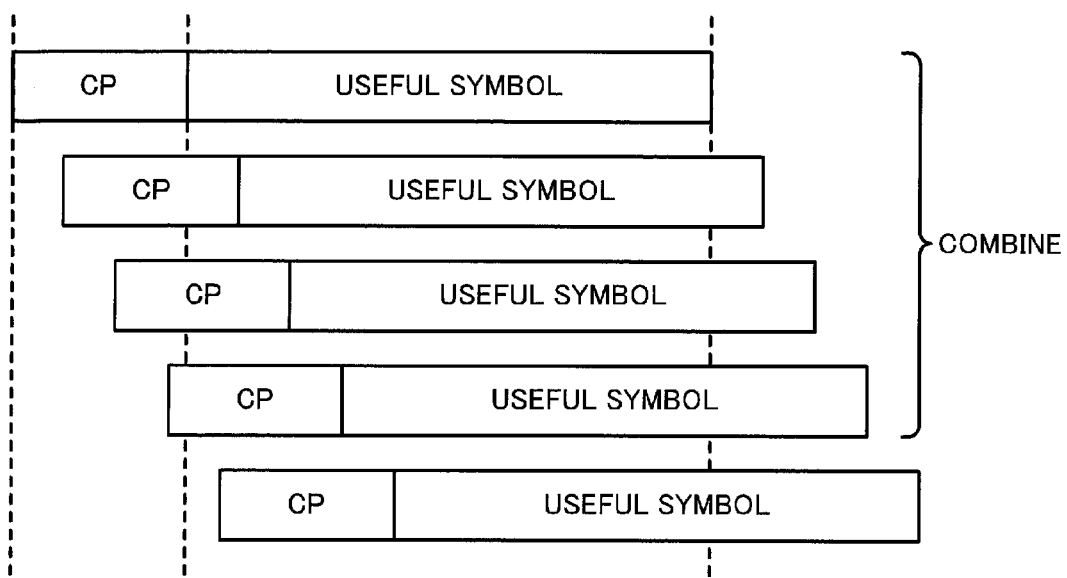
FIG. 7 illustrates a method of combining MBMS data signals.

FIG. 7 illustrates a method of combining MBMS data signals. According to the example of FIG. 7, a signal formed by superimposing MBMS data signals transmitted from five base stations upon each other is received by the mobile station 300 as a signal formed by superimposing a direct wave signal and four delay wave signals upon each other. Three out of the four delay wave signals have a delay time equal to or less than the cyclic prefix length, and the remaining one has a delay time exceeding the cyclic prefix length. In this case, the mobile station 300 combines the direct wave signal and the three delay wave signals and demodulates the combined MBMS data signal.

Figure 8:
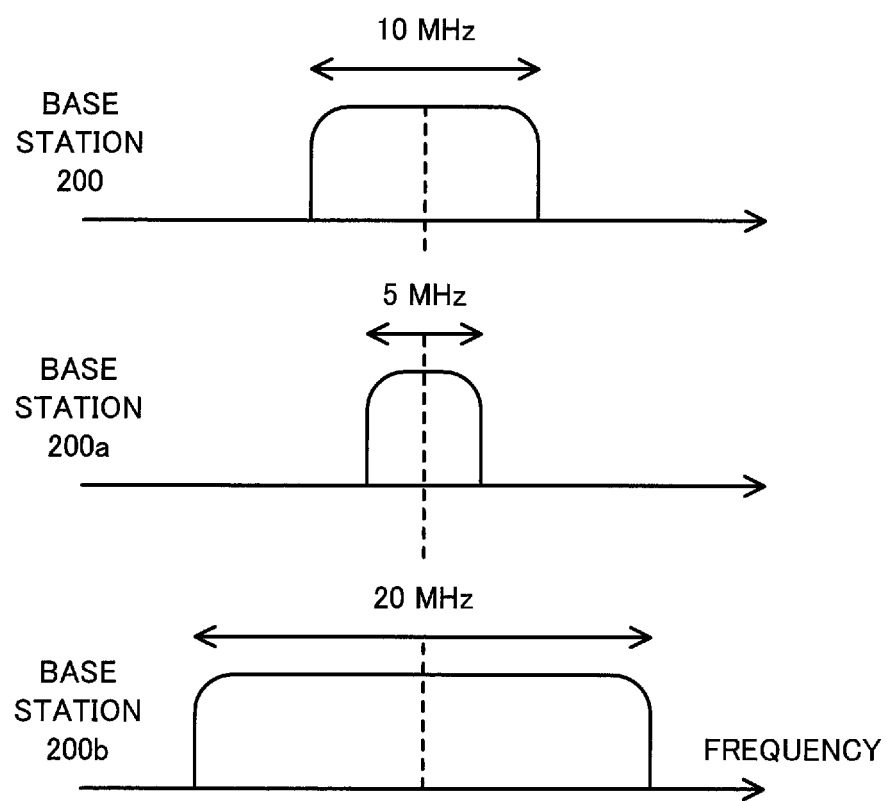
FIG. 8 illustrates an example of how to set a frequency band.

FIG. 8 illustrates a frequency band setting example. The base stations 200, 200a, and 200b may employ different frequency bands for radio communication, as described above. According to the example of FIG. 8, the base station 200 uses a frequency bandwidth of 10 MHz; the base station 200a uses a frequency bandwidth of 5 MHz; and the base station 200b uses a frequency bandwidth of 20 MHz, and all the base stations 200, 200a, and 200b operate at the same center frequency. If the center frequency is fixed, a frequency band for radio communication is identified by designating a bandwidth.

Note however that base stations may have different center frequencies. Further, some base stations may use a collection of multiple discrete frequency bands for radio communication. In these cases, a frequency band is identified by designating both a center frequency and a bandwidth. If band numbers are individually assigned to four 5-MHz blocks obtained by dividing the maximum frequency bandwidth of 20 MHz, a frequency band is identified by designating a band number.

Figure 9:
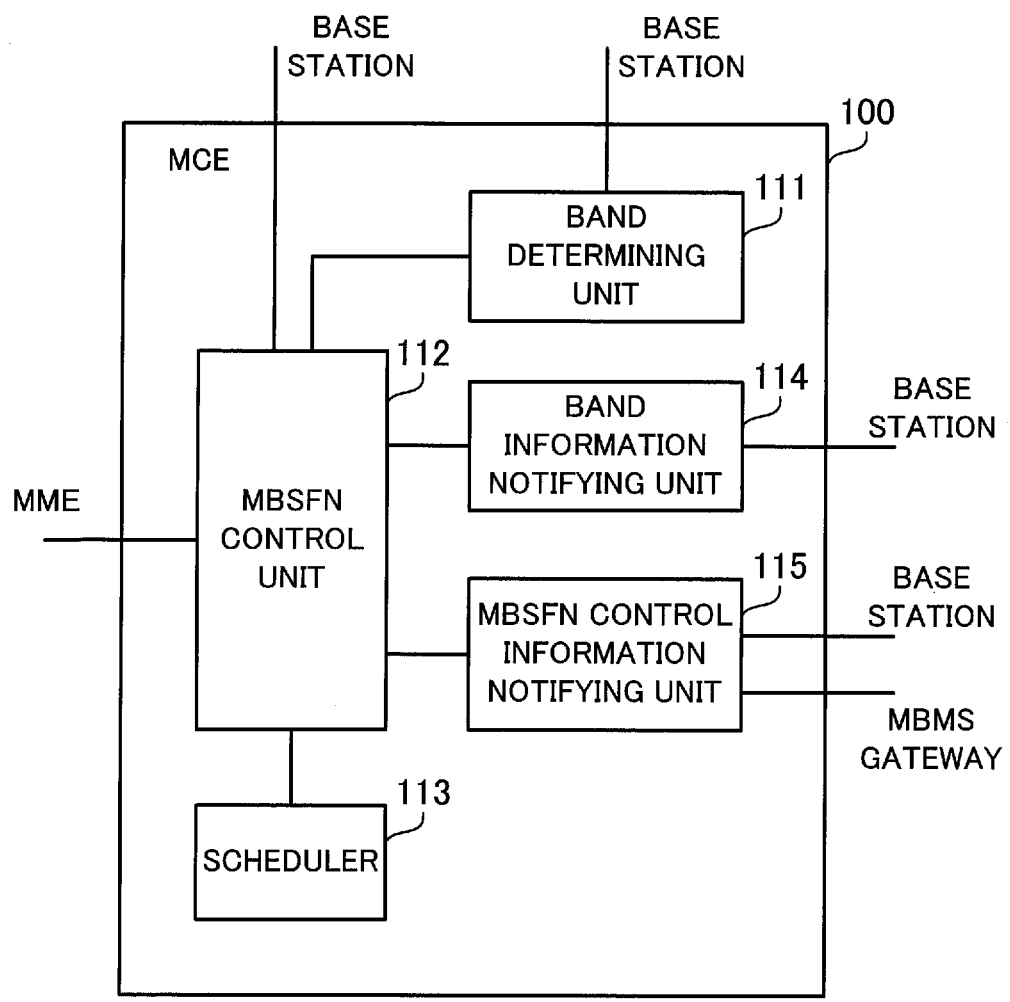
FIG. 9 is a block diagram of an MCE.

FIG. 9 is a block diagram of an MCE. The MCE 100 includes a band determining unit 111, an MBSFN control unit 112, a scheduler 113, a band information notifying unit 114, and an MBSFN control information notifying unit 115. Note that an integration of the band determining unit 111 and the MBSFN control unit 112 represents an example of the control unit 11 described above while the band information notifying unit 114 is an example of the notifying unit 12.

The band determining unit 111 acquires, from each of the base stations 200, 200a, and 200b, a band notification indicating a frequency band used by (or available for) the base station for radio communication. The band notification includes, for example, information indicating a bandwidth or information indicating both a center frequency and a bandwidth. Based on the acquired band notifications, the band determining unit 111 determines a frequency range common to all the base stations 200, 200a, and 200b as a frequency band available for MBSFN operation. Subsequently, the band determining unit 111 notifies the determined frequency range to the MBSFN control unit 112.

When forming an MBSFN area, the MBSFN control unit 112 communicates with the MME 41 to establish an MBSFN session. In addition, the MBSFN control unit 112 notifies the MBSFN control information notifying unit 115 of a list of MBMS services to be provided. Further, referring to the amount of MBMS data to be transmitted, the MBSFN control unit 112 selects a frequency band to be used for the MBSFN session out of the available frequency band notified of by the band determining unit 111. Alternatively, the whole of the available frequency band may be always selected as the frequency band for the MBSFN session. Subsequently, the MBSFN control unit 112 notifies the band information notifying unit 114 of the selected frequency band.

In addition, the MBSFN control unit 112 acquires, from the base station 200, an MBSFN request transmitted by the mobile station 300, and instructs the scheduler 113 to schedule transmission of MBMS data for a requested MBMS service. Subsequently, the MBSFN control unit 112 notifies the MBSFN control information notifying unit 115 of a scheduling result including information on allocated radio resources and an MCS.

The scheduler 113 schedules transmission of the MBMS data according to the instruction of the MBSFN control unit 112. In the scheduling, the scheduler 113 allocates radio resources within the frequency band selected by the MBSFN control unit 112 to transmission of the MBMS data. In addition, the scheduler 113 selects a predetermined MCS as one to be used for the transmission of the MBMS data. Alternatively, the scheduler 113 may acquire, from the base station 200, channel quality information indicating data reception quality measured at the mobile station 300 and select an MCS according to the data reception quality.

The band information notifying unit 114 generates band information indicating the frequency band selected by the MBSFN control unit 112, and transmits the band information to the base stations 200, 200a, and 200b. The MBSFN control information notifying unit 115 generates MBSFN control information indicating the list of MBMS services, and transmits the MBSFN control information to the base stations 200, 200a, and 200b. In addition, the MBSFN control information notifying unit 115 also generates MBSFN control information indicating a result of the MBMS data scheduling, and transmits the MBSFN control information to the base stations 200, 200a, and 200b and the MBMS gateway 42. Note that the transmission cycle of the band information may be the same as, or different from the transmission cycle of the MBSFN control information (for example, longer than the transmission cycle of the MBSFN control information).

Figure 10:
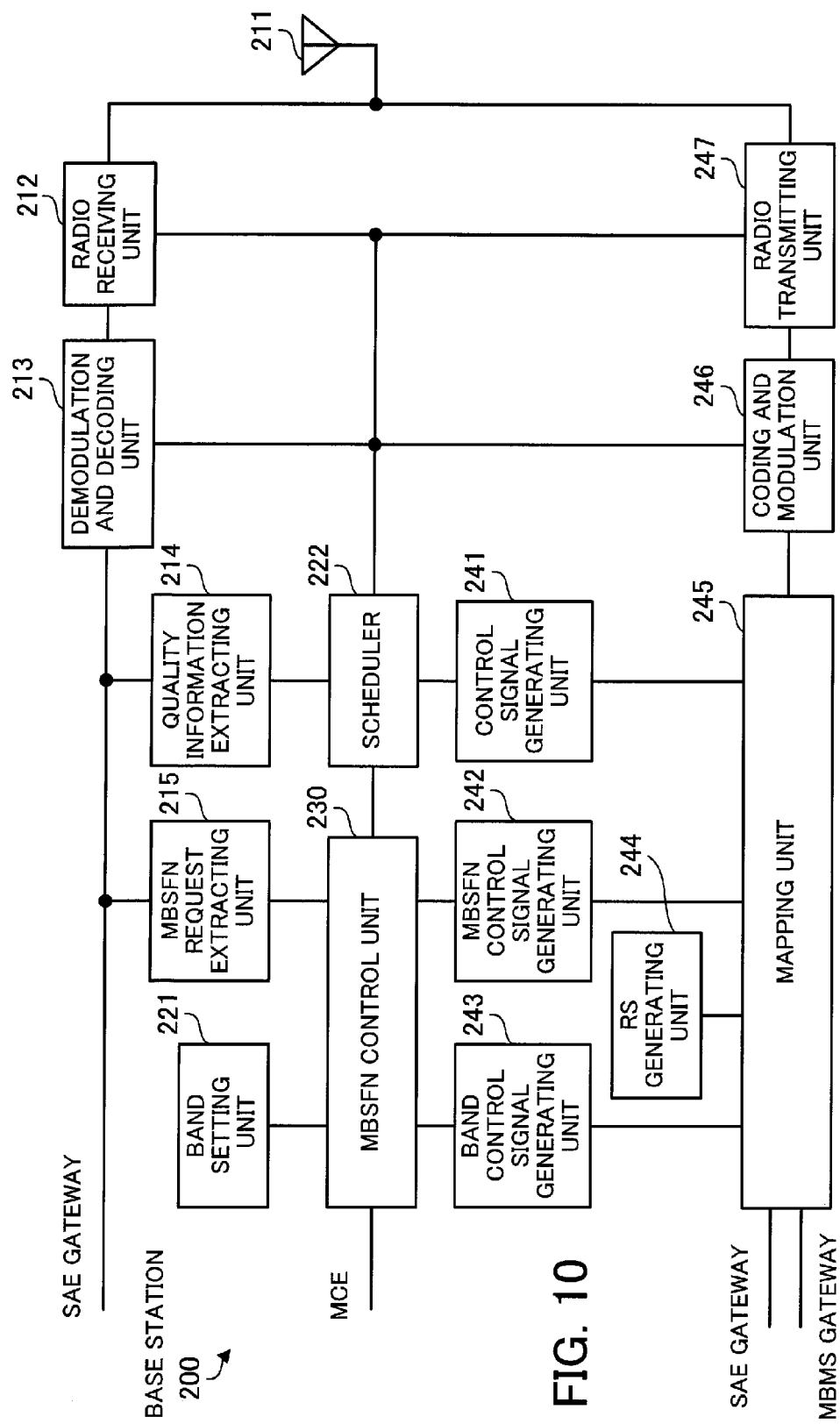
FIG. 10 is a block diagram of a base station.

FIG. 10 is a block diagram of a base station. The base station 200 includes an antenna 211; a radio receiving unit 212; a demodulation and decoding unit 213; a quality information extracting unit 214; an MBSFN request extracting unit 215; a band setting unit 221; a scheduler 222, an MBSFN control unit 230; a control signal generating unit 241; an MBSFN control signal generating unit 242; a band control signal generating unit 243; a reference signal generating unit 244; a mapping unit 245; a coding and modulation unit 246; and a radio transmitting unit 247. The base stations 200a and 200b are also implemented using the same block architecture as the base station 200. Note that an integration of the mapping unit 245, the coding and modulation unit 246, and the radio transmitting unit 247 represents an example of the transmitting unit 21 described above while the MBSFN control unit 230 is an example of the control unit 22.

The antenna 211 receives a radio signal transmitted from the mobile station 300 and outputs the radio signal to the radio receiving unit 212. The antenna 211 also outputs a transmission signal acquired from the radio transmitting unit 247 as a radio signal. Note that, instead of the two-way transmitting and receiving antenna, a transmitting antenna and a receiving antenna may be separately provided in the base station 200.

The radio receiving unit 212 carries out radio signal processing on the received signal acquired from the antenna 211 and converts the high-frequency radio signal into a baseband signal as a low-frequency signal (down-conversion). For the radio signal processing, the radio receiving unit 212 includes circuits such as a low noise amplifier (LNA), a quadrature demodulator, and an ADC (analog to digital converter).

The demodulation and decoding unit 213 demodulates and error-correction-decodes the baseband signal acquired from the radio receiving unit 212. The baseband signal is demodulated and decoded by a method corresponding to a predetermined MCS or an MCS instructed by the scheduler 222. Extracted dedicated data of the mobile station 300 is transferred to the SAE gateway 43.

The quality information extracting unit 214 extracts channel quality information transmitted by the mobile station 300. The channel quality information indicates data reception quality measured at the mobile station 300, and is, for example, a CQI (channel quality indicator) representing the data reception quality using a discrete value. The channel quality information is transmitted on a Physical Uplink Control Channel (PUCCH). The quality information extracting unit 214 outputs the extracted channel quality information to the scheduler 222.

The MBSFN request extracting unit 215 extracts an MBSFN request transmitted by the mobile station 300. The MBSFN request includes information indicating an MBMS service desired by the mobile station 300 and is transmitted on a Physical Uplink Shared Channel (PUSCH). The MBSFN request extracting unit 215 outputs the extracted MBSFN request to the MBSFN control unit 230.

The band setting unit 221 sets a frequency band to be used for radio communication between the base station 200 and the mobile station 300. According to a setting made by an operator, the band setting unit 221 sets the frequency band at the start of operation of the base station 200. In addition, when a predetermined condition (for example, a condition for a period of time) is satisfied, the band setting unit 221 changes the frequency band to be used. The band setting unit 221 notifies the MBSFN control unit 230 of a frequency band in current use.

The scheduler 222 schedules transmission and reception of dedicated data of the mobile station 300. In the scheduling, the scheduler 222 refers to the channel quality information acquired from the quality information extracting unit 214 and a result of MBMS data scheduling notified of by the MBSFN control unit 230. The scheduling includes allocation of radio resources and selection of an MCS. For dedicated data directed to the mobile station 300, radio resources other than the MBSFN subframe are allocated. Based on a result of the dedicated data scheduling, the scheduler 222 controls signal processing of the radio receiving unit 212, the demodulation and decoding unit 213, the coding and modulation unit 246, and the radio transmitting unit 247. The scheduler 222 also notifies the control signal generating unit 241 of the result of the dedicated data scheduling.

The MBSFN control unit 230 generates a band notification indicating the frequency band set by the band setting unit 221 and transmits the band notification to the MCE 100. The MBSFN control unit 230 also transfers the MBSFN request extracted by the MBSFN request extracting unit 215 to the MCE 100. In addition, the MBSFN control unit 230 outputs MBSFN control information to the MBSFN control signal generating unit 242 after receiving it from the MCE 100. Further, the MBSFN control unit 230 outputs band information to the band control signal generating unit 243 after receiving it from the MCE 100. Based on the received band information and MBSFN control information, the MBSFN control unit 230 controls a frequency band and radio resources used for the MBSFN subframe, and notifies the scheduler 222 of the result of MBMS data scheduling.

Based on the result of the dedicated data scheduling notified of by the scheduler 222, the control signal generating unit 241 generates a dedicated transmission control signal to be transmitted on a Physical Downlink Control Channel (PDCCH). The dedicated transmission control signal includes information indicating radio resources and an MCS used for dedicated data transmission. The control signal generating unit 241 outputs the generated dedicated transmission control signal to the mapping unit 245.

Based on the MBSFN control information received from the MCE 100, the MBSFN control signal generating unit 242 generates an MBSFN control signal to be transmitted on a PMCH (Physical Multicast Channel). The MBSFN control signal includes information indicating the list of MBMS services and information indicating the radio resources and the MCS to be used for MBMS data transmission. The MBSFN control signal generating unit 242 outputs the generated MBSFN control signal to the mapping unit 245. Note that the following two channels are mapped to the PMCH: an MCCH (Multicast Control Channel) which is a logical channel for transmitting MBSFN control information; and an MTCH (Multicast Traffic Channel) which is a logical channel for transmitting MBMS data.

Based on the band information received from the MCE 100, the band control signal generating unit 243 generates a band control signal to be transmitted on the PMCH (MCCH), and then outputs the band control signal to the mapping unit 245.

The reference signal generating unit 244 generates reference signals which are known pilot signals, and then outputs the reference signals to the mapping unit 245.

The mapping unit 245 maps, to a downlink radio frame, MBMS data received from the MBMS gateway 42 and dedicated data received from the SAE gateway 43. To the downlink radio frame, the mapping unit 245 also maps the signals acquired from the control signal generating unit 241, the MBSFN control signal generating unit 242, the band control signal generating unit 243, and the reference signal generating unit 244. Subsequently, the mapping unit 245 outputs a transmission signal of the downlink radio frame to the coding and modulation unit 246.

The coding and modulation unit 246 error-correction-codes and modulates the transmission signal acquired from the mapping unit 245, and outputs a resultant transmission signal to the radio transmitting unit 247. For the coding and modulation, a predetermined MCS or an MCS instructed by the scheduler 222 is used.

The radio transmitting unit 247 carries out radio signal processing on the transmission signal acquired from the coding and modulation unit 246 to thereby convert the low-frequency baseband signal into a high-frequency radio signal (up-conversion). For the radio signal processing, the radio transmitting unit 247 includes circuits such as a DAC (digital to analog converter), a quadrature modulator, a power amplifier, and so on.

Figure 11:
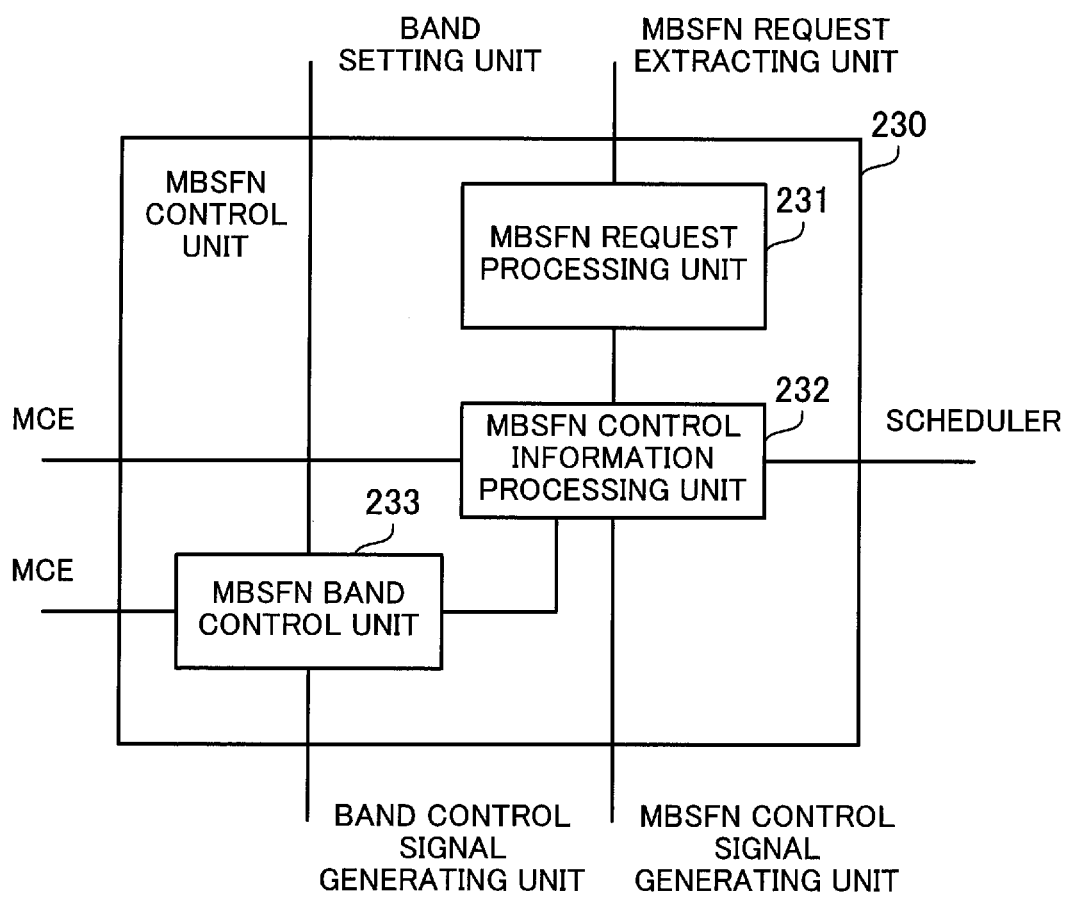
FIG. 11 is a block diagram of an MBSFN control unit of the base station.

FIG. 11 is a block diagram of an MBSFN control unit of a base station. The MBSFN control unit 230 includes an MBSFN request processing unit 231, an MBSFN control information processing unit 232, and an MBSFN band control unit 233.

The MBSFN request processing unit 231 acquires, from the MBSFN request extracting unit 215, the MBSFN request transmitted by the mobile station 300 and then outputs the MBSFN request to the MBSFN control information processing unit 232.

The MBSFN control information processing unit 232 acquires the MBSFN control information transmitted by the MCE 100. Subsequently, based on the MBSFN scheduling result indicated by the MBSFN control information and an MBSFN frequency band notified of by the MBSFN band control unit 233, the MBSFN control information processing unit 232 configures settings for an MBSFN subframe, a frequency band used for the MBSFN subframe, the PMCH, and the like. In addition, the MBSFN control information processing unit 232 notifies the scheduler 222 of the result of the MBMS data scheduling, and outputs the MBSFN control information to the MBSFN control single generating unit 242.

The MBSFN band control unit 233 transmits a band notification indicating a frequency band used by the base station 200 to the MCE 100 at a predetermined timing. The predetermined timing may be the time when an MBSFN session is started and the time when a change is made to the frequency band used by the base station 200. In addition, the MBSFN band control unit 233 acquires band information transmitted by the MCE 100, then notifies the MBSFN control information processing unit 232 of the MBSFN frequency band indicated by the band information, and outputs the band information to the band control signal generating unit 243.

Figure 12:
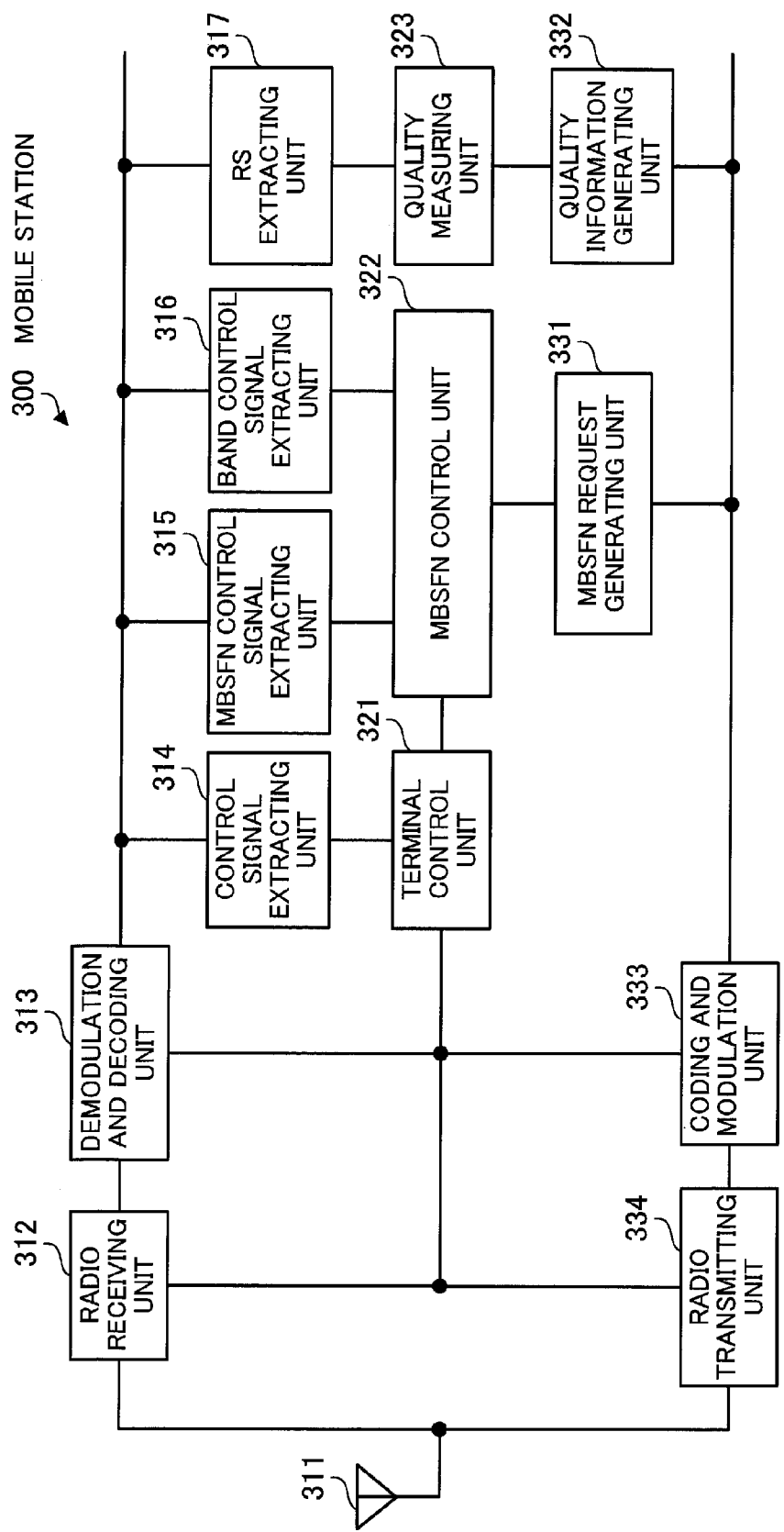
FIG. 12 is a block diagram of a mobile station.

FIG. 12 is a block diagram of a mobile station. The mobile station 300 includes an antenna 311; a radio receiving unit 312; a demodulation and decoding unit 313; a control signal extracting unit 314; an MBSFN control signal extracting unit 315; a band control signal extracting unit 316; a reference signal extracting unit 317; a terminal control unit 321; an MBSFN control unit 322; a quality measuring unit 323; an MBSFN request generating unit 331; a quality information generating unit 332; a coding and modulation unit 333; and a radio transmitting unit 334. Note that the MBSFN control unit 322 is an example of the control unit 31 described above.

The antenna 311 receives a signal corresponding to radio signals transmitted by multiple base stations including the base stations 200, 200a, and 200b, and outputs the received signal to the radio receiving unit 312. The antenna 311 also wirelessly outputs a transmission signal acquired from the radio transmitting unit 334. Note that, instead of the two-way transmitting and receiving antenna, a transmitting antenna and a receiving antenna may be separately provided in the mobile station 300.

The radio receiving unit 312 carries out radio signal processing on the received signal acquired from the antenna 311 and downconverts the radio signal into a baseband signal. For the radio signal processing, the radio receiving unit 312 includes circuits such as an LNA, a quadrature demodulator, and an ADC.

The demodulation and decoding unit 313 demodulates and error-correction-decodes the baseband signal acquired from the radio receiving unit 312. The baseband signal is demodulated and decoded by a method corresponding to a predetermined MCS or an MCS instructed by the terminal control unit 321. Extracted dedicated data and MBMS data are transferred to a data processing unit of an upper layer (not illustrated), such as a processor. The case is considered that the mobile station 300 receives MBMS data transmitted by MBSFN. A signal received by the mobile station 300 is formed by superimposing MBMS data signals transmitted from multiple base stations upon each other. The received signal appears to the mobile station 300 as superposition of advance and delay waves. The demodulation and decoding unit 313 extracts delay wave signals each having a delay time equal to or less than the cyclic prefix length and combines the delay wave signals with a direct wave signal, and then demodulates and decodes the combined signal.

The control signal extracting unit 314 extracts the dedicated transmission control signal transmitted on the PDCCH. The dedicated transmission control signal includes information indicating radio resources and an MCS used for dedicated data transmission, as described above. The control signal extracting unit 314 outputs the extracted dedicated transmission control signal to the terminal control unit 321.

The MBSFN control signal extracting unit 315 extracts the MBSFN control signal transmitted on the PMCH with the MCCH mapped thereto. The MBSFN control signal includes information indicating a list of MBMS services and information indicating radio resources and an MCS used for MBMS data transmission, as described above. The MBSFN control signal extracting unit 315 outputs the extracted MBSFN control signal to the MBSFN control unit 322.

The band control signal extracting unit 316 extracts the band control signal transmitted on the PMCH with the MCCH mapped thereto, and outputs the extracted band control signal to the MBSFN control unit 322.

The reference signal extracting unit 317 extracts reference signals included in a downlink radio frame and outputs the extracted reference signals to the quality measuring unit 323.

The terminal control unit 321 controls transmission and reception of dedicated data based on the dedicated transmission control signal extracted by the control signal extracting unit 314. In addition, the terminal control unit 321 controls reception of MBMS data based on a notification from the MBSFN control unit 322. The terminal control unit 321 controls signal processing of the radio receiving unit 312, the demodulation and decoding unit 313, the coding and modulation unit 333, and the radio transmitting unit 334.

The MBSFN control unit 322 instructs the MBSFN request generating unit 331 to transmit an MBSFN request in order to start receiving MBMS data in response to, for example, a user's operation. In addition, the MBSFN control unit 322 acquires the MBSFN control signal extracted by the MBSFN control signal extracting unit 315 and the band control signal extracted by the band control signal extracting unit 316. Then, the MBSFN control unit 322 determines a frequency band and a timing for receiving an MBMS data signal and an MCS applied to the MBMS data, and notifies the terminal control unit 321 of the determined information.

The quality measuring unit 323 measures data reception quality, such as a CIR (Carrier to Interference Ratio), or radio channel quality, using the reference signals extracted by the reference signal extracting unit 317. Subsequently, the quality measuring unit 323 outputs the measurement result to the quality information generating unit 332 and also feeds the measurement result back to the reference signal extracting unit 317 in order to improve the accuracy of reference signal extraction.

The MBSFN request generating unit 331 generates an MBSFN request indicating an MBMS service desired to be used (a type of MBMS data desired to be received) in response to an instruction from the MBSFN control unit 322. The MBMS service asked for by the MBSFN request is selected from the list of MBMS services transmitted by the base station 200. The MBSFN request generating unit 331 outputs the generated MBSFN request to the coding and modulation unit 333.

The quality information generating unit 332 generates channel quality information indicating the data reception quality (or the radio channel quality) measured by the quality measuring unit 323. As the channel quality information, the CQI, for example, is used. The quality information generating unit 332 outputs the generated channel quality information to the coding and modulation unit 333.

The coding and modulation unit 333 error-correction-codes and modulates dedicated data to be transmitted on the PUSCH, the MBSFN request acquired from the MBSFN request generating unit 331, and the channel quality information acquired from the quality information generating unit 332, and then outputs a resultant transmission signal to the radio transmitting unit 334. For the coding and modulation, a predetermined MCS or an MCS instructed by the terminal control unit 321 is used.

The radio transmitting unit 334 carries out radio signal processing on the transmission signal acquired from the coding and modulation unit 333 to thereby upconvert the baseband signal into a radio signal. For the radio signal processing, the radio transmitting unit 334 includes circuits such as a DAC, a quadratuer modulator, a power amplifier, and so on.

Figure 13:
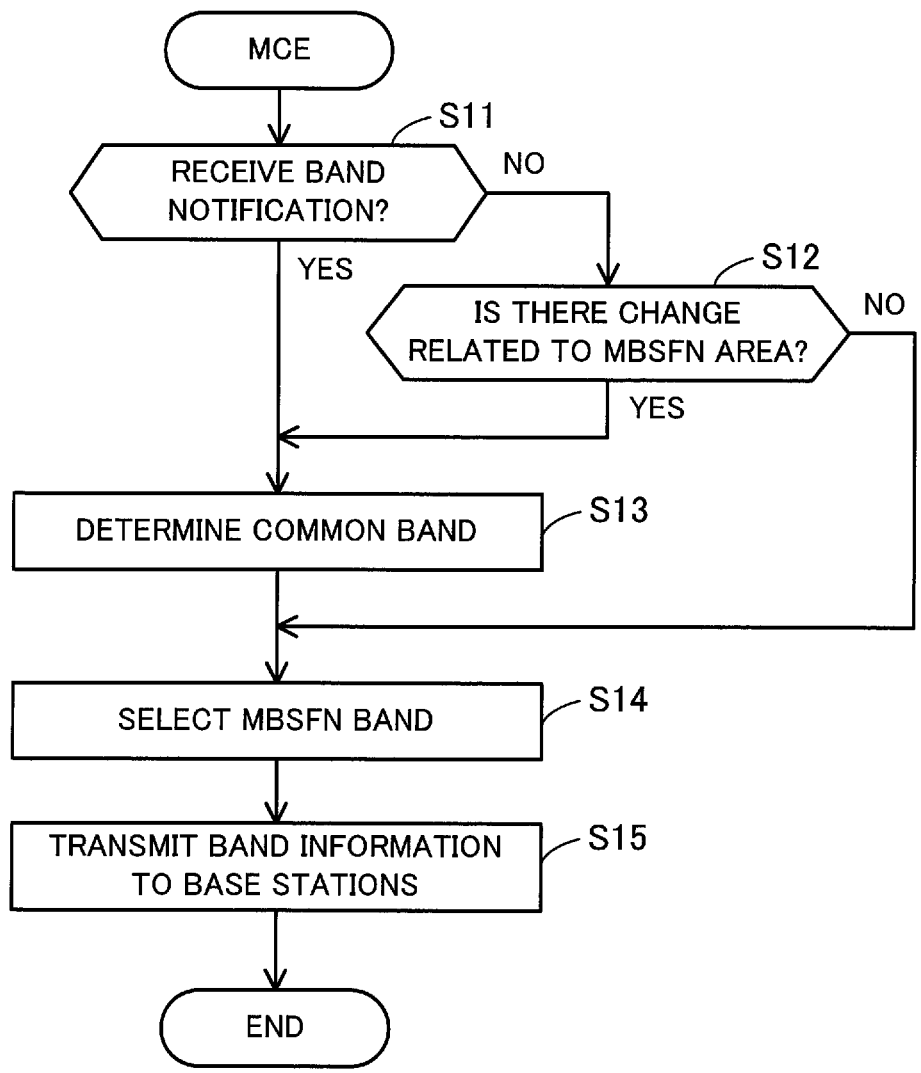
FIG. 13 is a flowchart illustrating band control exercised by the MCE.

FIG. 13 is a flowchart illustrating band control exercised by an MCE. The band control of FIG. 13 is described next according to the step numbers in the flowchart.

(Step S11) The band determining unit 111 determines whether to have received a band notification. For example, at the start of an MBSFN session, the band determining unit 111 determines whether to have received band notifications from all base stations belonging to a corresponding MBSFN area. On the other hand, after the start of the MBSFN operation, the band determining unit 111 determines whether to have received a band notification from one of the base stations of the MBSFN area. When the band determining unit 111 has received a band notification, the process moves to step S13. If not, the process moves to step S12.

(Step S12) The band determining unit 111 determines whether there is a change to the group of the base stations belonging to the MBSFN area (for example, whether there is an increase or a decrease in the base stations for carrying out MBSFN transmission). If there is a change to the group of the base stations, the process moves to step S13. If not, the process moves to step S14. Note that addition and deletion of base stations for MBSFN transmission are determined by the MCE 100 according to the usage situation of MBMS services.

(Step S13) Based on band notifications corrected from the base stations of the MBSFN area, the band determining unit 111 determines a common range within an entire frequency band used by the base stations for radio communication as a frequency band available for MBSFN. Note that when a base station belonging to the MBSFN area changes its frequency band for radio communication and when there is a change to the group of the base stations belonging to the MBSFN area, the frequency band available for MBSFN may also be changed.

(Step S14) The MBSFN control unit 112 selects a frequency band to be used for MBSFN out of the frequency band determined in step S13 (or a frequency band previously determined to be available for MBSFN). For example, the MBSFN control unit 112 selects a minimum frequency bandwidth to hold MBMS data to be transmitted. Note however that the whole of the available frequency band may always be selected as the frequency band to be used for MBSFN.

(Step S15) The band information notifying unit 114 generates band information indicating the frequency band selected in step S14, and transmits the band information to the base stations belonging to the MBSFN area. Note that the interval of transmitting the band information may be longer than that of MBSFN control information regarding scheduling of MBMS data transmission.

Figure 14:
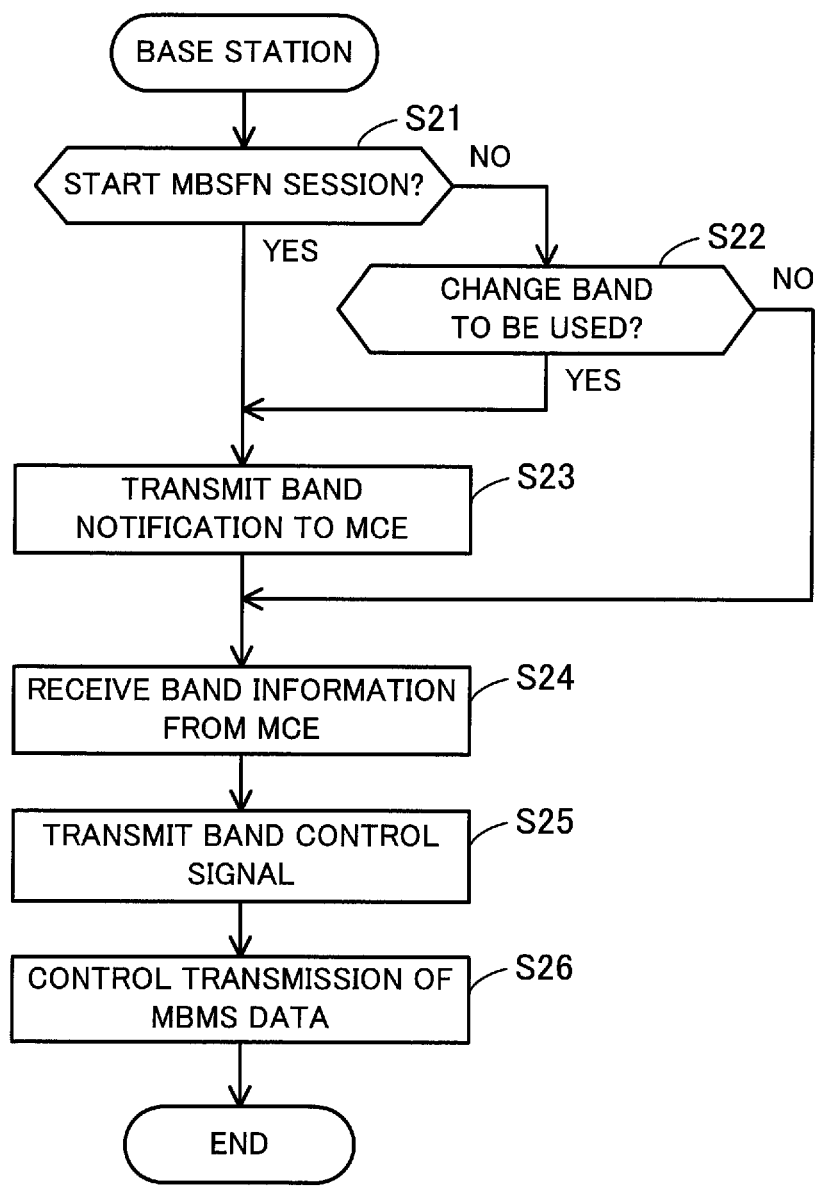
FIG. 14 is a flowchart illustrating band control exercised by the base station.

FIG. 14 is a flowchart illustrating band control exercised by a base station. The following is the case where the base station 200 exercises the band control. The band control of FIG. 14 is described next according to the step numbers in the flowchart.

(Step S21) The MBSFN control unit 230 determines whether it is when an MBSFN session (i.e., MBSFN operation) is started. If it is when an MBSFN session is started, the process moves to step S23. If not, the process moves to step S22.

(Step S22) The MBSFN control unit 230 determines whether there is a change to the frequency band that the base station 200 uses for radio communication with the mobile station 300. If there is a change, the process moves to step S23. If not, the process moves to step S24.

(Step S23) The MBSFN control unit 230 generates a band notification indicating a frequency band that the base station 200 uses, and transmits the band notification to the MCE 100.

(Step S24) The MBSFN control unit 230 receives, from the MCE 100, band information indicating a frequency band to be used for MBSFN.

(Step S25) Based on the band information received in step S24, the band control signal generating unit 243 generates a band control signal indicating the frequency band to be used for MBSFN. After being subjected to the processing by the mapping unit 245 and the coding and modulation unit 246, the band control signal is transmitted, to the mobile station 300, by the radio transmitting unit 247 on the PMCH (MCCH) in an MBSFN subframe.

(Step S26) The MBSFN control unit 230 uses the band information received in step S24 to thereby control transmission of MBMS data. For example, the MBSFN control unit 230 controls, in the MBSFN subframe, an MBMS data signal to be output in a range within the frequency band indicated by the band information.

Figure 15:
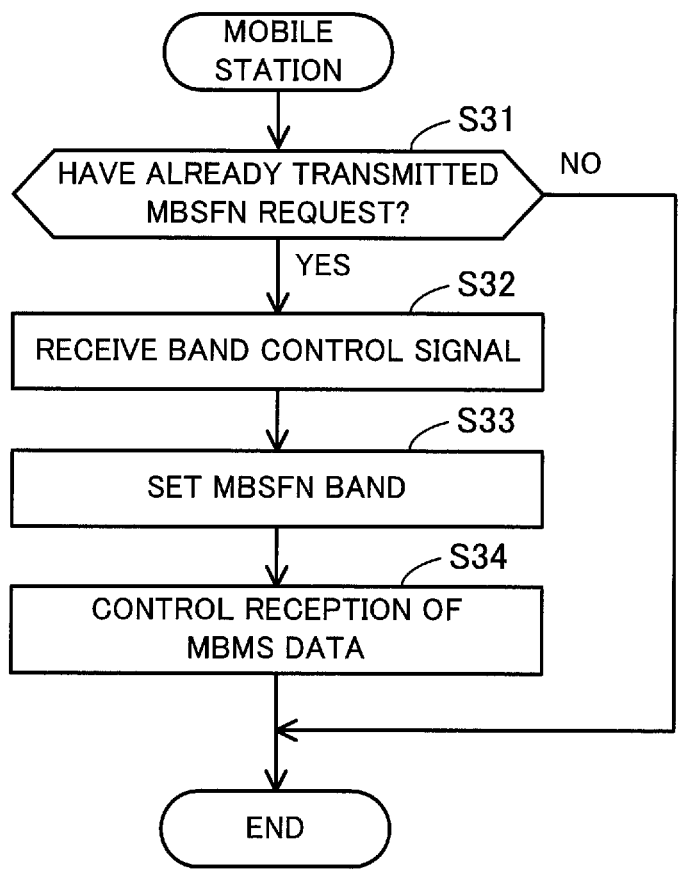
FIG. 15 is a flowchart illustrating band control exercised by the mobile station.

FIG. 15 is a flowchart illustrating band control exercised by a mobile station. The band control of FIG. 15 is described next according to the step numbers in the flowchart.

(Step S31) The MBSFN control unit 322 determines whether an MBSFN request has already been transmitted to the base station 200. If an MBSFN request has already been transmitted, the process moves to step S32. If not, the process is ended.

(Step S32) The band control signal extracting unit 316 extracts a band control signal transmitted in an MBSFN subframe by the base station 200. Note that the band control signal extracting unit 316 has been notified of the location of the MBSFN subframe with, for example, broadcast information transmitted by the base station 200.

(Step S33) The MBSFN control unit 322 identifies a frequency band to be used for MBSFN based on the band control signal extracted in step S32. The terminal control unit 321 sets the frequency band to be used for MBSFN.

(Step S34) Based on the frequency band set in step S33, the terminal control unit 321 controls reception of MBMS data. For example, the terminal control unit 321 extracts a radio signal in the set frequency band from the MBSFN subframe.

Figure 16:
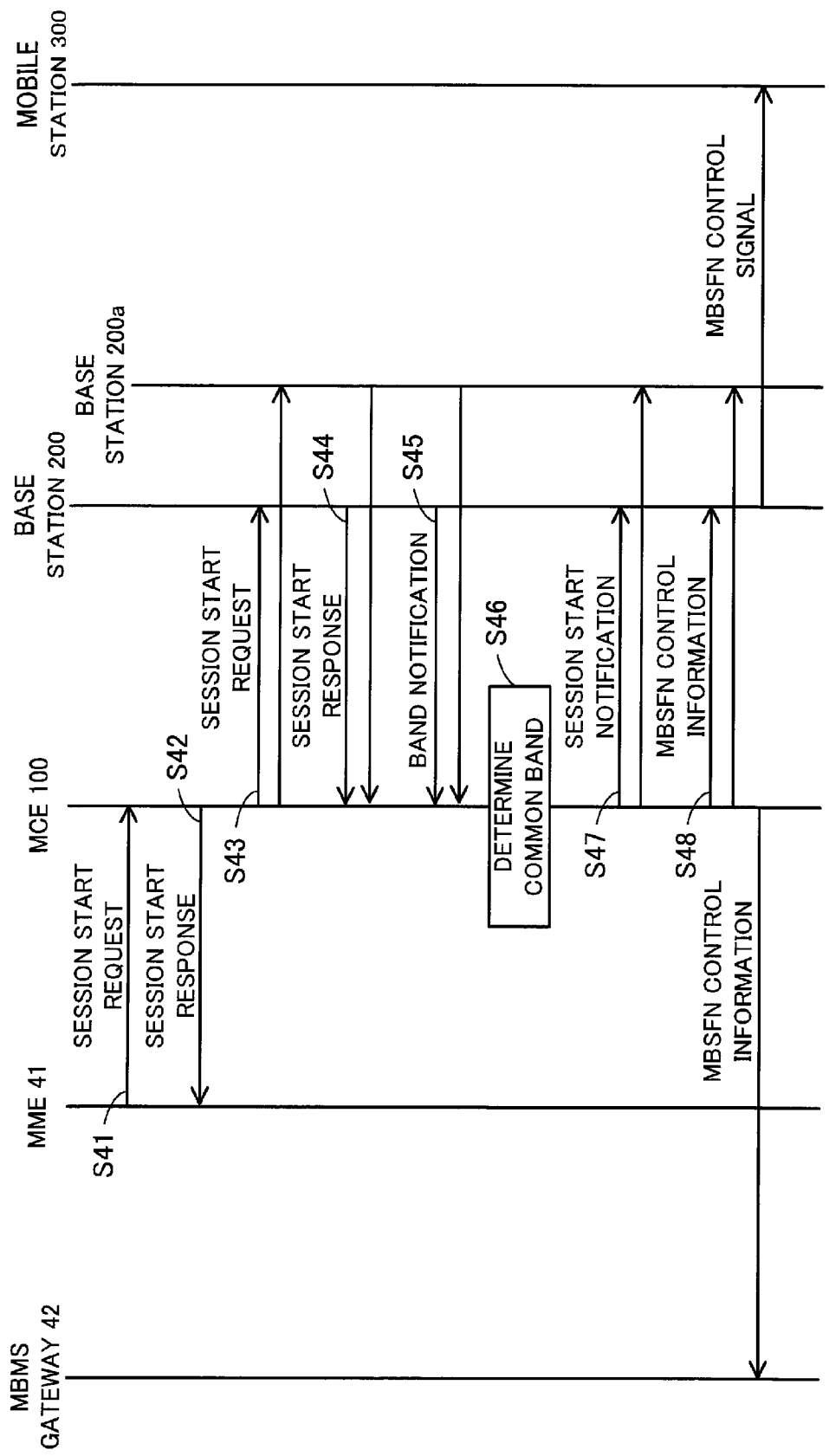
FIG. 16 is a sequence diagram illustrating a flow of communication according to the second embodiment.

FIG. 16 is a sequence diagram illustrating a flow of communication according to the second embodiment. The flow of communication of FIG. 16 is described next according to the step numbers in the sequence diagram.

(Step S41) When starting MBSFN operation, the MME 41 transmits a request for starting an MBSFN session to the MCE 100.

(Step S42) The MCE 100 determines to be ready to start MBSFN control, and transmits a response to the MBSFN session start request to the MME 41.

(Step S43) The MCE 100 selects base stations belonging to the MBSFN area, and transmits a request for starting an MBSFN session to each of the selected base stations (the base stations 200, 200a, and . . . ). Note that base stations other than the base stations 200 and 200a are omitted from FIG. 16.

(Step S44) Each of the base stations 200, 200a, and . . . determines to be ready to start MBSFN transmission, and transmits a response to the MBSFN session start request to the MCE 100.

(Step S45) Each of the base stations 200, 200a, and . . . transmits, to the MCE 100, a band notification indicating a frequency band that the base station uses for radio communication.

(Step S46) Based on the band notifications received in step S45, the MCE 100 determines a frequency band common to all the base stations 200, 200a, and . . . .

(Step S47) The MCE 100 transmits an MBSFN session start notification indicating start of MBSFN transmission to each of the base stations 200, 200*a*, and . . . .

(Step S48) The MCE 100 transmits, to each of the base stations 200, 200*a*, and . . . , MBSFN control information indicating a list of MBMS services available for the mobile station 300. The base station 200 transmits an MBSFN control signal indicating the list of MBMS services to the mobile station 300 on the PMCH (MCCH). In addition, the MCE 100 also transmits the MBSFN control information to the MBMS gateway 42.

Figure 17:
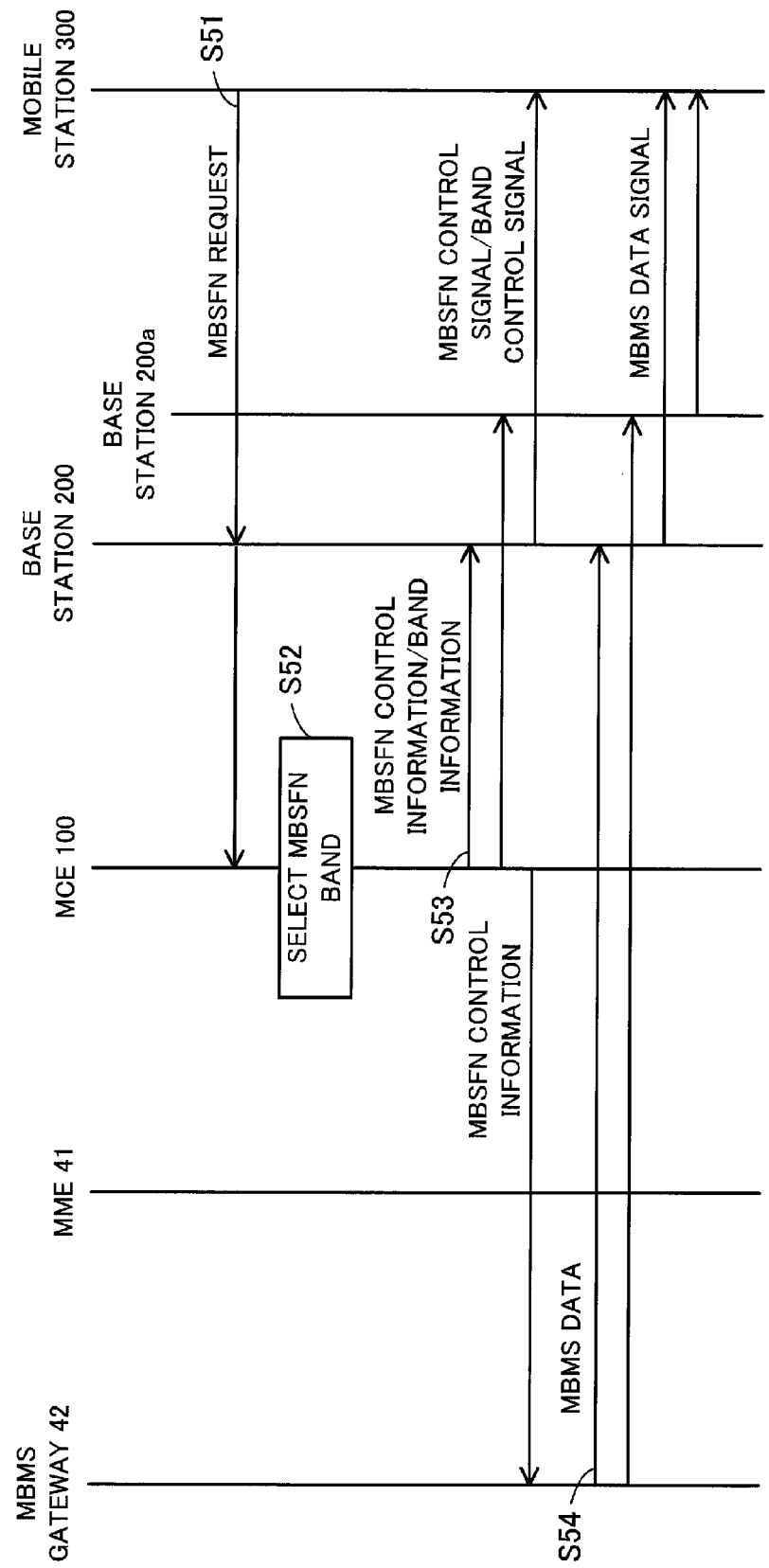
FIG. 17 is a sequence diagram (continuing from FIG. 16) illustrating the flow of communication according to the second embodiment.

FIG. 17 is a sequence diagram (continuing from FIG. 16) illustrating the flow of communication according to the second embodiment.

(Step S51) The mobile station 300 selects an MBMS service to use from the list indicated by the MBSFN control signal received in step S48, and transmits an MBSFN request to the base station 200 on the PUSCH. The base station 200 transfers the MBSFN request to the MCE 100.

(Step S52) The MCE 100 selects a frequency band to be used for MBSFN from the frequency band determined in step S46.

(Step S53) The MCE 100 transmits, to each of the base stations 200, 200*a*, and . . . , band information indicating the frequency band selected in step S52 and MBSFN control information regarding scheduling of MBMS data transmission. The base station 200 transmits, to the mobile station 300, a band control signal and an MBSFN control signal on the PMCH (MCCH). Based on the received band control signal and MBSFN control signal, the mobile station 300 configures settings for receiving MBMS data. In addition, the MCE 100 also transmits the MBSFN control information to the MBMS gateway 42. Note that the MBSFN control information and the band information may be transmitted at different times.

(Step S54) The MBMS gateway 42 transmits MBMS data to each of the base stations 200, 200*a*, and . . . . The base stations 200, 200*a*, and . . . individually transmit, to the mobile station 300, an MBMS data signal on the PMCH (MTCH). The mobile station 300 combines the MBMS data signals transmitted by the base stations 200, 200*a*, and . . . , and demodulates and decodes the combined signal.

Note that when there is a change to the frequency band of a base station belonging to the MBSFN area, the same processing as in the above-described steps S45 and S46 is repeated to thereby recalculate a frequency band available for MBSFN. In addition, when the MCE 100 adds or deletes a base station for participating in MBSFN transmission, the same processing as in step S46 is repeated to thereby recalculate a frequency band available for MBSFN. Upon recalculation of the available frequency band, the processing of steps S52 and S53 is executed based on the changed frequency band.

Figure 18:
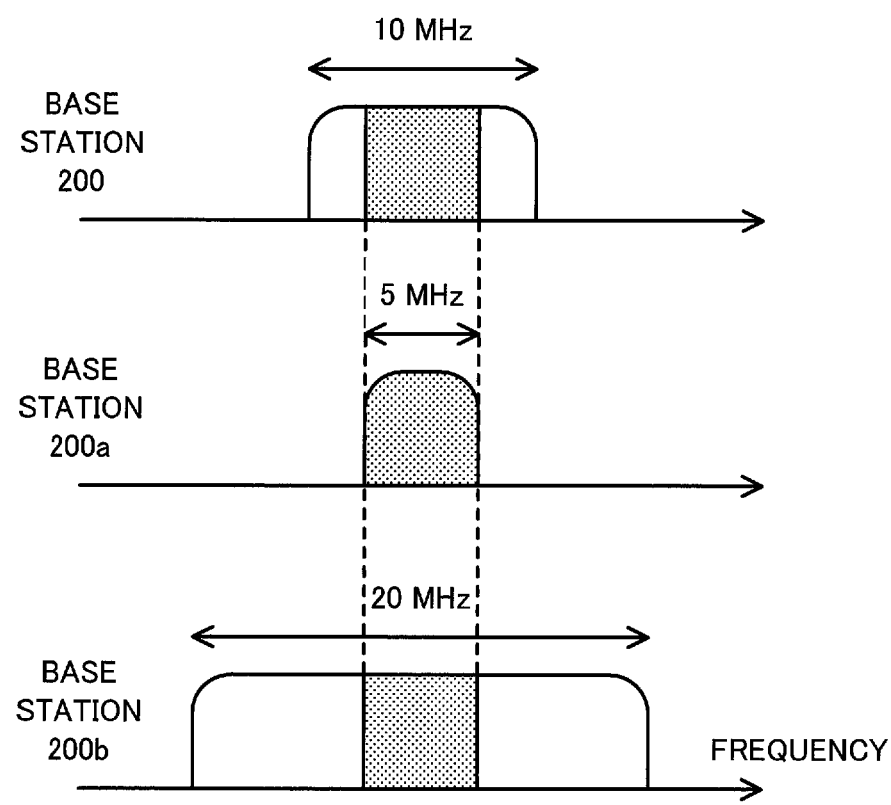
FIG. 18 illustrates a first example of how to set an MBSFN band.

FIG. 18 illustrates a first example of how to set an MBSFN band. This example depicts the case where base stations belonging to an MBSFN area have frequency bands with the same center frequency. For example, the base station 200 operates in a frequency band of 10 MHz, the base station 200*a* operates in a frequency band of 5 MHz, and the base station 200*b* operates in a frequency band of 20 MHz.

In this case, a band notification transmitted by the base station 200 to the MCE 100 indicates that the base station 200 uses a bandwidth of 10 MHz. Similarly, a band notification transmitted by the base station 200*a* to the MCE 100 indicates that the base station 200*a* uses a bandwidth of 5 MHz while a band notification transmitted by the base station 200*b* to the MCE 100 indicates that the base station 200*b* uses a bandwidth of 20 MHz. Subsequently, the MCE 100 determines, for example, the minimum bandwidth of 5 MHz among the bandwidths of 5 MHz, 10 MHz, and 20 MHz as a frequency band to be used for MBSFN. Then, the MCE 100 transmits band information indicating the determined bandwidth of 5 MHz to each of the base stations 200, 200*a*, and 200*b*. The base stations 200, 200*a*, and 200*b* individually set the 5 MHz frequency band around the center frequency as the frequency band to be used for MBSFN.

Figure 19:
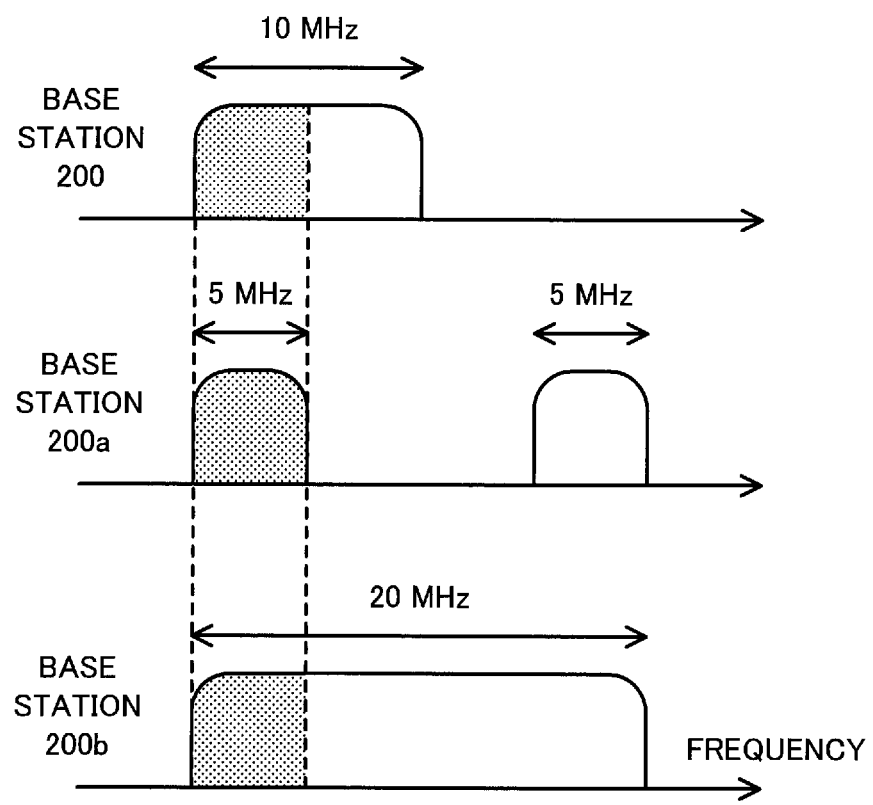
FIG. 19 illustrates a second example of how to set the MBSFN band.

FIG. 19 illustrates a second example of how to set an MBSFN band. This example depicts the case where base stations belonging to an MBSFN area have frequency bands with different center frequencies. For example, the base station 200 operates in a continuous frequency band of 10 MHz while the base station 200*a* operates in two discrete frequency bands of 5 MHz (10 MHz bandwidth in total). In addition, the base station 200*b* operates in a continuous frequency band of 20 MHz.

In this case, a band notification transmitted by the base station 200 to the MCE 100 indicates the bandwidth that the base station 200 uses (10 MHz) and its center frequency. A band notification transmitted by the base station 200*a* to the MCE 100 indicates the two bandwidths that the base station 200*a* uses (5 MHz×2) and their individual center frequencies. A band notification transmitted by the base station 200*b* to the MCE 100 indicates the bandwidth that the base station 200*b* uses (20 MHz) and its center frequency. Subsequently, the MCE 100 selects, for example, a 5 MHz frequency band commonly used by the base stations 200, 200*a*, and 200*b* as a frequency band to be used for MBSFN. Then, the MCE 100 transmits band information indicating the selected 5 MHz-width frequency band and its center frequency to each of the base stations 200, 200*a*, and 200*b*. The base stations 200, 200*a*, and 200*b* individually set the frequency band indicated by the band information as the frequency band to be used for MBSFN.

Note that, in the description above, the MCE 100 transmits, to each of the base stations 200, 200*a*, and 200*b*, the band information separately from the MBSFN control information. However, the band information may be transmitted as part of the MBSFN control information, instead. In addition, in the case of transmitting MBMS data with real-time transmission restrictions by MBSFN, the MCE 100 may select a frequency band to be used for MBSFN in consideration of a needed transmission rate of the MBMS data.

Figure 20:
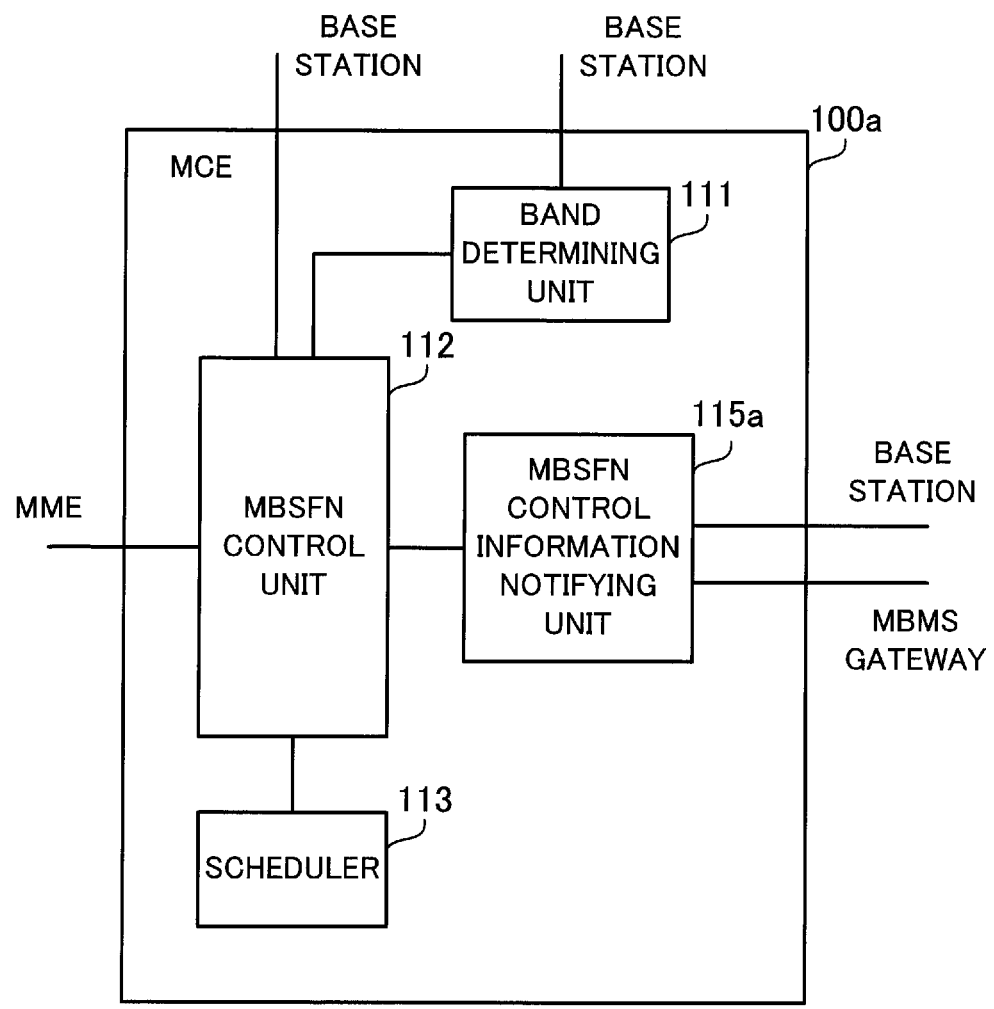
FIG. 20 is a block diagram illustrating a first modification example of an MCE according to a first modification.

FIG. 20 is a block diagram illustrating a first modification example of an MCE according to a first modification. An MCE 100*a* of FIG. 20 may be used in place of the MCE 100. The MCE 100*a* includes an MBSFN control information notifying unit 115*a*, in place of the band information notifying unit 114 and the MBSFN control information notifying unit 115 of the MCE 100.

In response to an instruction from the MBSFN control unit 112, the MBSFN control information notifying unit 115*a* generates MBSFN control information, which is then transmitted to the base stations 200, 200*a*, and 200*b* or the MBMS gateway 42. The MBSFN control information may include band information indicating a frequency band to be used for MBSFN. Note that in place of the band determining unit 111, the MBSFN control unit 112, and the MBSFN control information notifying unit 115*a*, a control unit assuming all the functions of these units may be provided in the MCE 100*a*.

Figure 21:
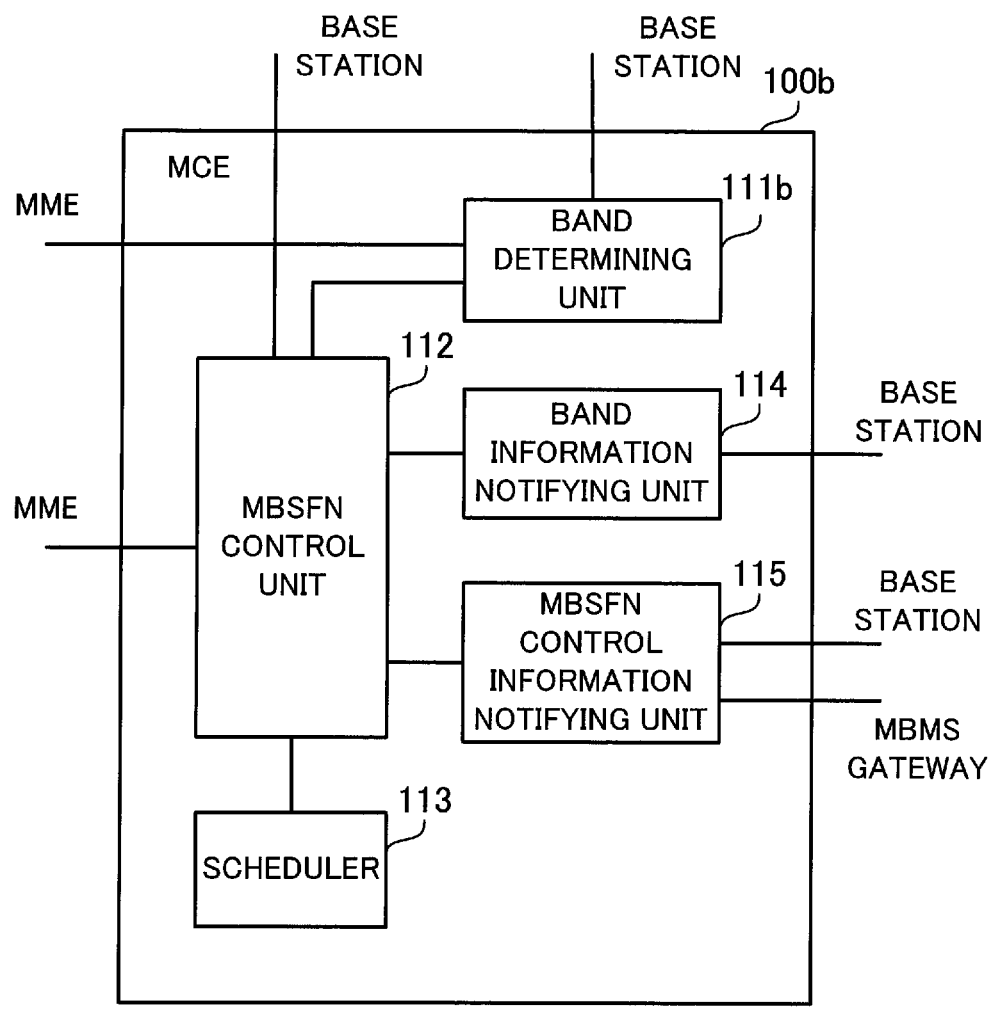
FIG. 21 is a block diagram illustrating a second modification example of an MCE according to a second modification.

FIG. 21 is a block diagram illustrating a second modification example of an MCE according to a second modification. An MCE 100*b* of FIG. 21 may be used in place of the MCE 100. The MCE 100*b* includes a band determining unit 111*b* in place of the band determining unit 111 of the MCE 100. The band determining unit 111*b* receives, from the MME 41, information indicating a needed transmission rate of MBMS data with a need for real-time transmission. For example, between steps S41 and S42 described above, the band determining unit 111*b* receives information indicating the needed transmission rate. Subsequently, the band determining unit 111*b* calculates a minimum bandwidth to satisfy the needed transmission rate, and notifies the MBSFN control unit 112 of the minimum bandwidth. The MBSFN control unit 112 reserves, for MBSFN, a frequency band with at least the bandwidth notified of by the band determining unit 111*b*.

Note that, in the description above, each of the base stations 200, 200*a*, and 200*b* is able to use a frequency band up to 20 MHz for downlink radio communication on the basis of LTE. However, on the basis of LTE-A, each of the base stations 200, 200*a*, and 200*b* may use up to five 20-MHz frequency bands for downlink radio communication. In LTE-A, each frequency band of 20 MHz or less is called a component carrier (CC).

Figure 22:
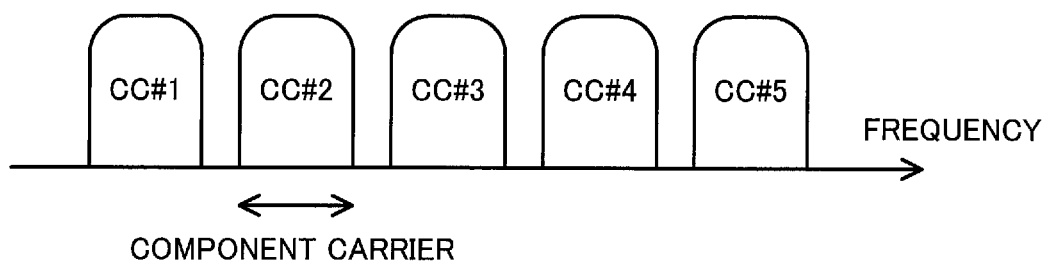
FIG. 22 illustrates a configuration example of component carriers.

FIG. 22 illustrates a configuration example of component carriers. The base stations 200, 200*a*, and 200*b* may individually use up to five component carriers (CCs #1 to #5) for downlink radio communication. A bandwidth of each component carrier is selected from among, for example, 1.4 MHz, 3 MHz, 5 MHz, 10 MHz, 15 MHz, and 20 MHz. Note that CCs #1 to #5 may have different bandwidths. Each of CCs #1 to #5 transmits a radio frame as illustrated in FIG. 4. The base stations 200, 200*a*, and 200*b* control radio resource allocation for each component carrier.

The base stations 200, 200*a*, 200*b* respectively aggregate multiple component carriers for radio communication with the mobile station 300 (i.e., use multiple component carriers at the same time). This enables radio communication using a wider frequency band than the frequency band of a single component carrier. All CCs #1 to #5 may be provided in a single frequency band, such as an 800 MHz band, a 2.0 GHz band, or a 3.5 GHz band, or may be provided separately in multiple different frequency bands. Aggregating multiple component carriers is sometimes referred to as the "carrier aggregation". Carrier aggregation of component carriers belonging to different frequency bands is sometimes referred to as the "spectrum aggregation".

According to the above-described method of setting an MBSFN frequency band, the MBSFN frequency band may be provided within a single component carrier, or over multiple component carriers. For example, each of the base stations 200, 200*a*, and 200*b* transmits a band notification indicating bandwidths of the individual CCs #1 to #5 to the MCE 100. The MCE 100 selects a component carrier used for MBSFN (for example, a lowest frequency component carrier), and then selects a frequency band based on the bandwidths of the selected component carrier of the individual base stations 200, 200*a*, and 200*b*. Alternatively, the MCE 100 selects one or more component carriers and a frequency band used for MBSFN based on the bandwidths of CCs #1 to #5 of the base stations 200, 200*a*, and 200*b*.

With the mobile communication system according to the second embodiment described above, the MCE 100 recognizes setting statuses of radio communication frequency bands used by individual base stations in the MBSFN area to be thereby able to select an appropriate frequency band for MBSFN. The appropriate selection of the frequency band for MBSFN reduces the possibility of rendering some base stations in the MBSFN area incapable of transmitting part of MBMS data due to lack of radio resources. As a result, it is possible to reduce loss of quality in MBMS data reception at the mobile station 300.

In addition, as compared to the case of selecting the frequency band to be used for MBSFN on the basis of using the smallest possible bandwidth (for example, 1.4 MHz) set for the base stations in the MBSFN area, the second embodiment prevents the bandwidth of the frequency band to be used for MBSFN from becoming excessively small and, thus, ensures the efficient use of radio resources of the individual base stations. In addition, the MCE 100 is able to provide a dynamic update of the frequency band used for MBSFN when a change is made to the frequency band of a base station belonging to the MBSFN area or when there is a change to the group of the base stations belonging to the MBSFN area.

Third Embodiment

A third embodiment is described next. Hereinafter, the discussion will be focused on differences from the second embodiment while the explanations of the components common to the second embodiment are omitted. A mobile communication system of the third embodiment is different from that of the second embodiment in a path used to transmit band notifications from base stations to an MCE.

The mobile communication system of the third embodiment may be achieved using the same system configuration as that of the mobile communication system of the second embodiment illustrated in FIG. 2. Note however that, in the third embodiment, an MME 400 described below is used in place of the MME 41. An MCE, base stations, and a mobile station of the third embodiment are implemented using the same block architectures as the individual counterparts of the second embodiment, illustrated in FIGS. 9 to 12. In the following description, the MCE, base stations, and mobile station of the third embodiment are denoted by the same reference numerals in the second embodiment.

Figure 23:
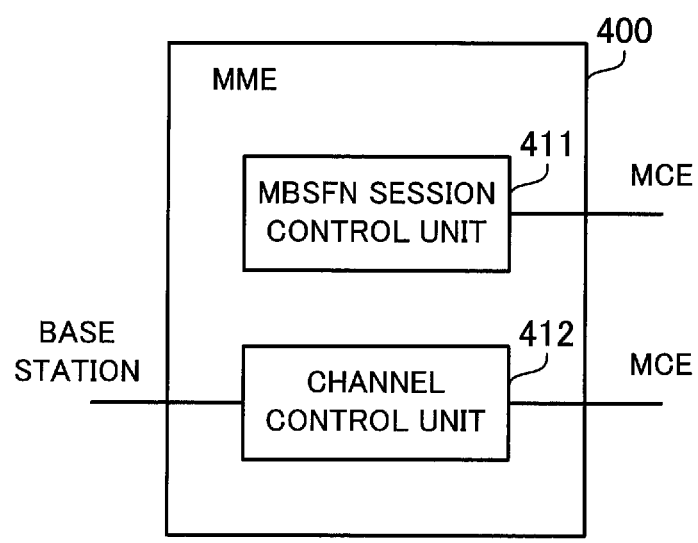
FIG. 23 is a block diagram of an MME.

FIG. 23 is a block diagram of an MME. The MME 400 includes an MBSFN session control unit 411 and a channel control unit 412. The MBSFN session control unit 411 controls start of an MBSFN session. The MBSFN session control unit 411 transmits an MBSFN session start request to the MCE 100, and subsequently receives an MBSFN session start response from the MCE 100. The channel control unit 412 receives a band notification from each of the base stations 200, 200*a*, and 200*b* and, then, transfers the band notifications to the MCE 100.

Figure 24:
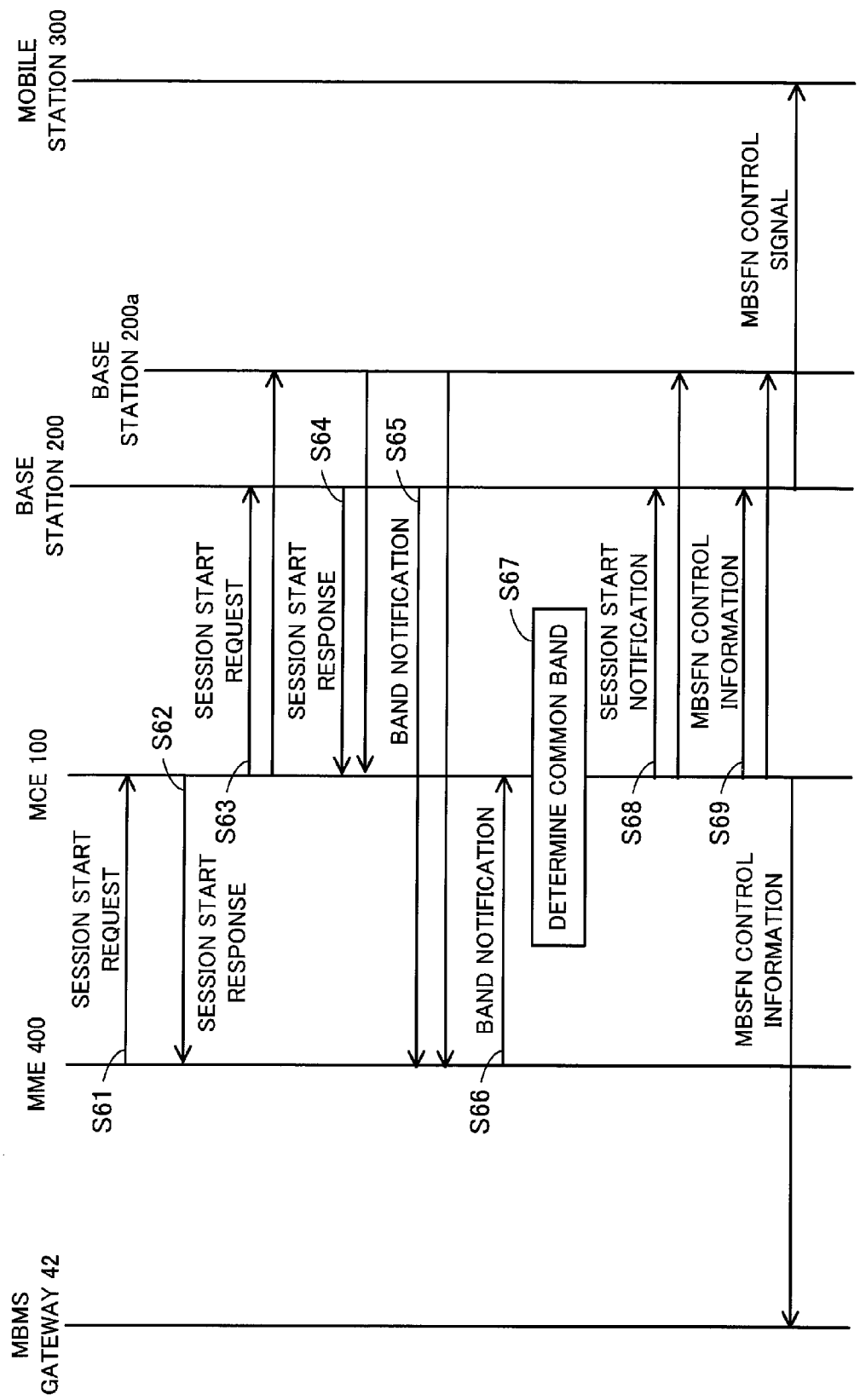
FIG. 24 is a sequence diagram illustrating a flow of communication according to a third embodiment.

FIG. 24 is a sequence diagram illustrating a flow of communication according to the third embodiment. Among steps S61 to S69 of FIG. 24, the operations of steps S61 to S64, S68, and S69 are the same as those of steps S41 to S44, S47, and S48 of FIG. 16.

(Step S65) Each of the base stations 200, 200*a*, and . . . transmits, to the MME 400 without the MCE 100, a band notification indicating a frequency band that the base station uses for radio communication.

(Step S66) The MME 400 transfers the band notifications received from the base stations 200, 200*a*, and . . . to the MCE 100. Note that in the case of the start of an MBSFN session, the MME 400 may transfer each of the band notifications received from the base stations 200, 200*a*, and . . . to the MCE 100, or transfer collectively band notifications of two or more base stations to the MCE 100.

(Step S67) Based on the band notifications received from the MME 400 in step S66, the MCE 100 determines a frequency band common to all the base stations 200, 200*a*, and . . . .

Note that in the case where a change is made to the frequency band of a base station belonging to the MBSFN area, a band notification is transferred via the MME 400 to the MCE 100, which subsequently recalculates a frequency band available for MBSFN.

According to such a mobile communication system of the third embodiment, the same effect as in the second embodiment may be achieved. In addition, according to the third embodiment, the MCE 100 controls MBSFN in efficient cooperation with the MME 400 having the channel control function.

According to the above-described radio communication system and method therefor, communication controller, and base station, it is possible to reduce loss of data reception quality in the case where data with common content is transmitted from two or more base stations.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio receiving apparatus which is included in a radio communication system, the radio communication system further including a communication control apparatus and a plurality of base stations, in which radio communication system, two or more base stations among the plurality of base stations transmit data with common content to the radio receiving apparatus at a frequency common to the two or more base stations, the radio receiving apparatus comprising:

a receiver configured to receive the data with common content which is transmitted from the two or more base stations based on information on a frequency band notified of by the communication control apparatus, the frequency band being selected, by the communication control apparatus, from a frequency range commonly included in two or more frequency bands which are respectively used by the two or more base stations for radio communication.

2. A radio receiving apparatus which is included in a radio communication system, the radio communication system further including a communication control apparatus and a plurality of base stations, in which radio communication system, two or more base stations among the plurality of base stations transmit data with common content to the radio receiving apparatus at a frequency common to the two or more base stations, the radio receiving apparatus comprising:

a receiver configured to receive the data with common content transmitted from the two or more base stations based on information, notified of by the communication control apparatus, on a frequency band that the communication control apparatus selects from a frequency range commonly included in frequency bands notified of by the two or more base stations, wherein the frequency bands is used by the base station for radio communication.

* * * * *